United States Patent
Vasudeva

(10) Patent No.: US 8,131,845 B1
(45) Date of Patent: *Mar. 6, 2012

(54) SYSTEM AND METHOD TO MONITOR PERFORMANCE OF DIFFERENT DOMAINS ASSOCIATED WITH A COMPUTER OR NETWORK

(75) Inventor: Vivek Vasudeva, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 4 days.

This patent is subject to a terminal disclaimer.

(21) Appl. No.: 12/486,808

(22) Filed: Jun. 18, 2009

Related U.S. Application Data

(62) Division of application No. 10/608,686, filed on Jun. 27, 2003, now Pat. No. 7,568,025.

(51) Int. Cl.
*G06F 15/173* (2006.01)

(52) U.S. Cl. .................. 709/224; 709/202; 709/208

(58) Field of Classification Search .................. 709/224
See application file for complete search history.

(56) References Cited

U.S. PATENT DOCUMENTS

| | | | | |
|---|---|---|---|---|
| 4,811,216 A * | 3/1989 | Bishop et al. ............ | 711/153 |
| 5,696,486 A | 12/1997 | Poliquin et al. | |
| 5,726,912 A | 3/1998 | Krall, Jr. et al. | |
| 6,023,507 A | 2/2000 | Wookey | |
| 6,085,244 A | 7/2000 | Wookey | |
| 6,247,056 B1 * | 6/2001 | Chou et al. ............... | 709/229 |
| 6,253,253 B1 * | 6/2001 | Mason et al. ............. | 719/315 |
| 6,278,694 B1 * | 8/2001 | Wolf et al. ................ | 370/253 |
| 6,295,558 B1 * | 9/2001 | Davis et al. ............... | 709/224 |
| 6,314,463 B1 * | 11/2001 | Abbott et al. ............. | 709/224 |
| 6,438,539 B1 | 8/2002 | Korolev et al. | |
| 6,510,432 B1 | 1/2003 | Doyle | |
| 6,519,638 B1 * | 2/2003 | Forman et al. ............ | 709/224 |
| 6,629,145 B1 * | 9/2003 | Pham et al. ............... | 709/230 |
| 6,647,427 B1 * | 11/2003 | Watanabe .................. | 709/239 |
| 6,735,702 B1 | 5/2004 | Yavatkar et al. | |
| 7,028,312 B1 * | 4/2006 | Merrick et al. ........... | 719/330 |
| 7,143,153 B1 | 11/2006 | Black et al. | |
| 7,328,260 B1 * | 2/2008 | Muthiyan et al. ......... | 709/224 |
| 7,383,332 B2 * | 6/2008 | Chong et al. .............. | 709/224 |
| 7,730,169 B1 * | 6/2010 | Greschler et al. ........ | 709/223 |
| 2002/0004818 A1 * | 1/2002 | Lansio et al. ............. | 709/203 |
| 2002/0093691 A1 * | 7/2002 | Durrant et al. ............ | 358/404 |
| 2002/0152239 A1 * | 10/2002 | Bautista-Lloyd et al. .. | 707/513 |
| 2003/0115337 A1 * | 6/2003 | Jayam et al. .............. | 709/228 |
| 2003/0145125 A1 * | 7/2003 | Horikawa .................. | 709/318 |
| 2003/0217068 A1 | 11/2003 | Fruchtman et al. | |

(Continued)

OTHER PUBLICATIONS

Webinar—Introducing Mercury Interactive Functional Testing License: A Complete Solution for Enterprise Testing Environments, Apr. 15, 2003, Mercury Interactive website (2 pages).

(Continued)

*Primary Examiner* — Christopher Biagini

(74) *Attorney, Agent, or Firm* — Michael A. Springs; Moore & Van Allen PLLC; James C. Edwards

(57) ABSTRACT

A system to monitor performance may include at least one probe to collect data related to performance of an associated domain. The system may also include at least one base station to receive data from associated ones of the at least one probe.

35 Claims, 22 Drawing Sheets

U.S. PATENT DOCUMENTS

| | | | |
|---|---|---|---|
| 2003/0225549 | A1 | 12/2003 | Shay et al. |
| 2004/0030778 | A1 | 2/2004 | Kronenberg et al. |
| 2004/0068560 | A1* | 4/2004 | Oulu et al. .................... 709/224 |
| 2004/0199815 | A1 | 10/2004 | Dinker et al. |
| 2005/0027870 | A1 | 2/2005 | Trebes, Jr. |
| 2005/0027892 | A1 | 2/2005 | McCabe et al. |
| 2005/0034029 | A1 | 2/2005 | Ramberg et al. |
| 2005/0180337 | A1 | 8/2005 | Roemerman et al. |
| 2007/0050777 | A1 | 3/2007 | Hutchinson et al. |

OTHER PUBLICATIONS

LoadRunner-Load Testing for the Enterprise from Mercury Interactive Website (2 pages) Jun. 2000.

WinRunner-Test Automation for the Enterprise from Mercury Interactive website (1 page) May 2000.

IBM Tivoli Business Systems Manager from IBM website (2 pages) Apr. 7, 2003.

IBM Tivoli Monitoring for Network Performance from IBM website (2 pages) Apr. 23, 2003.

* cited by examiner

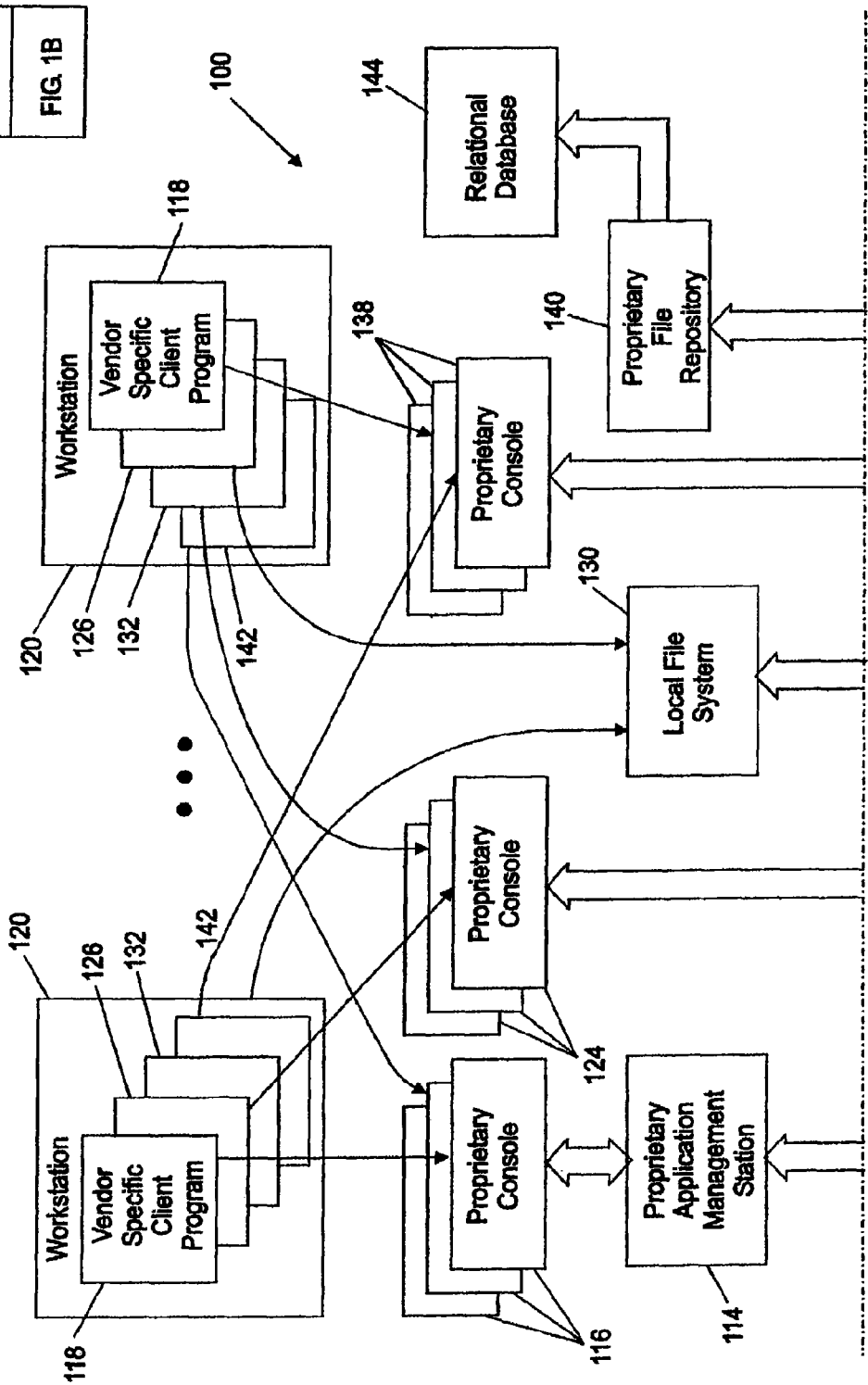

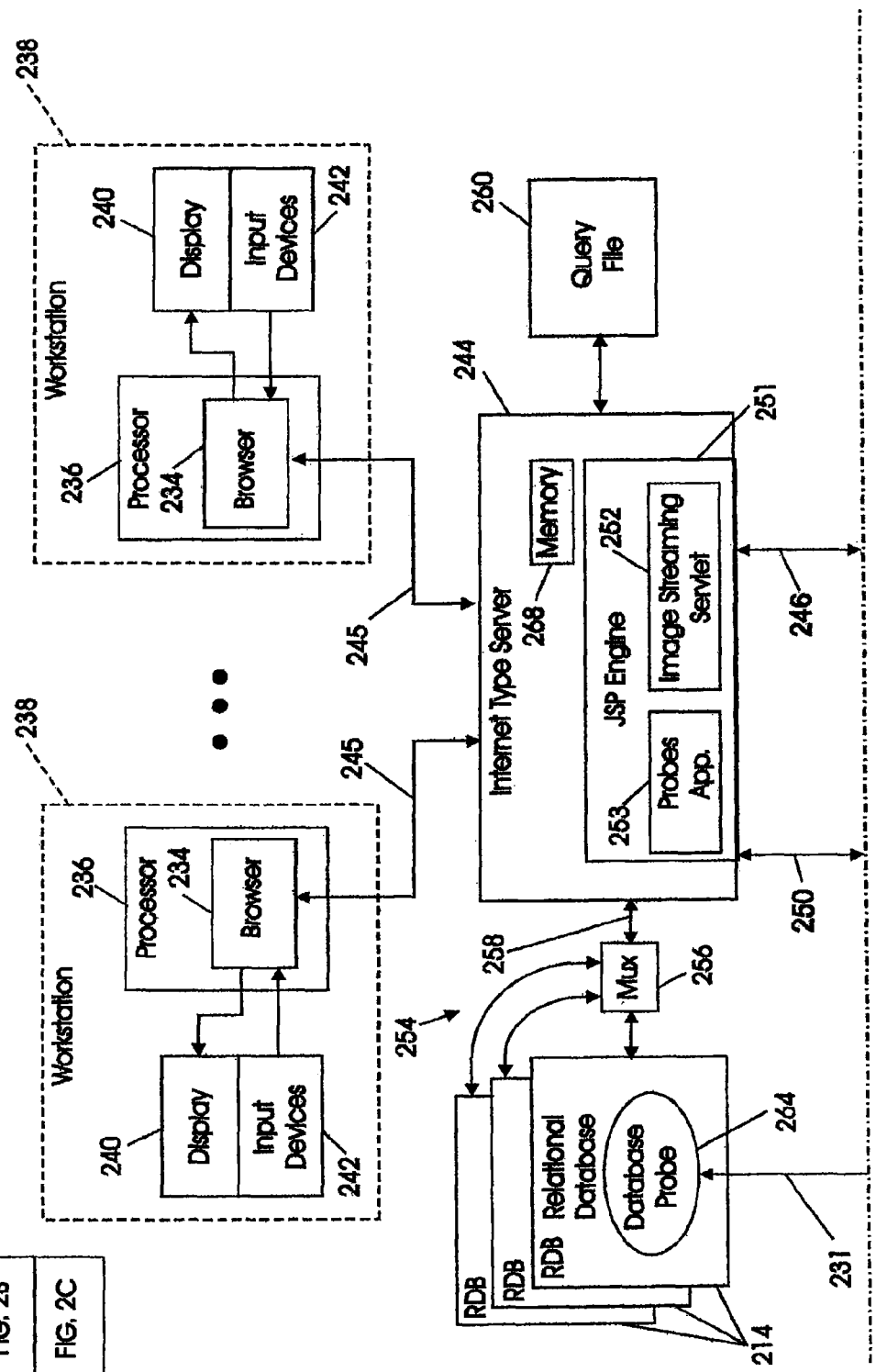

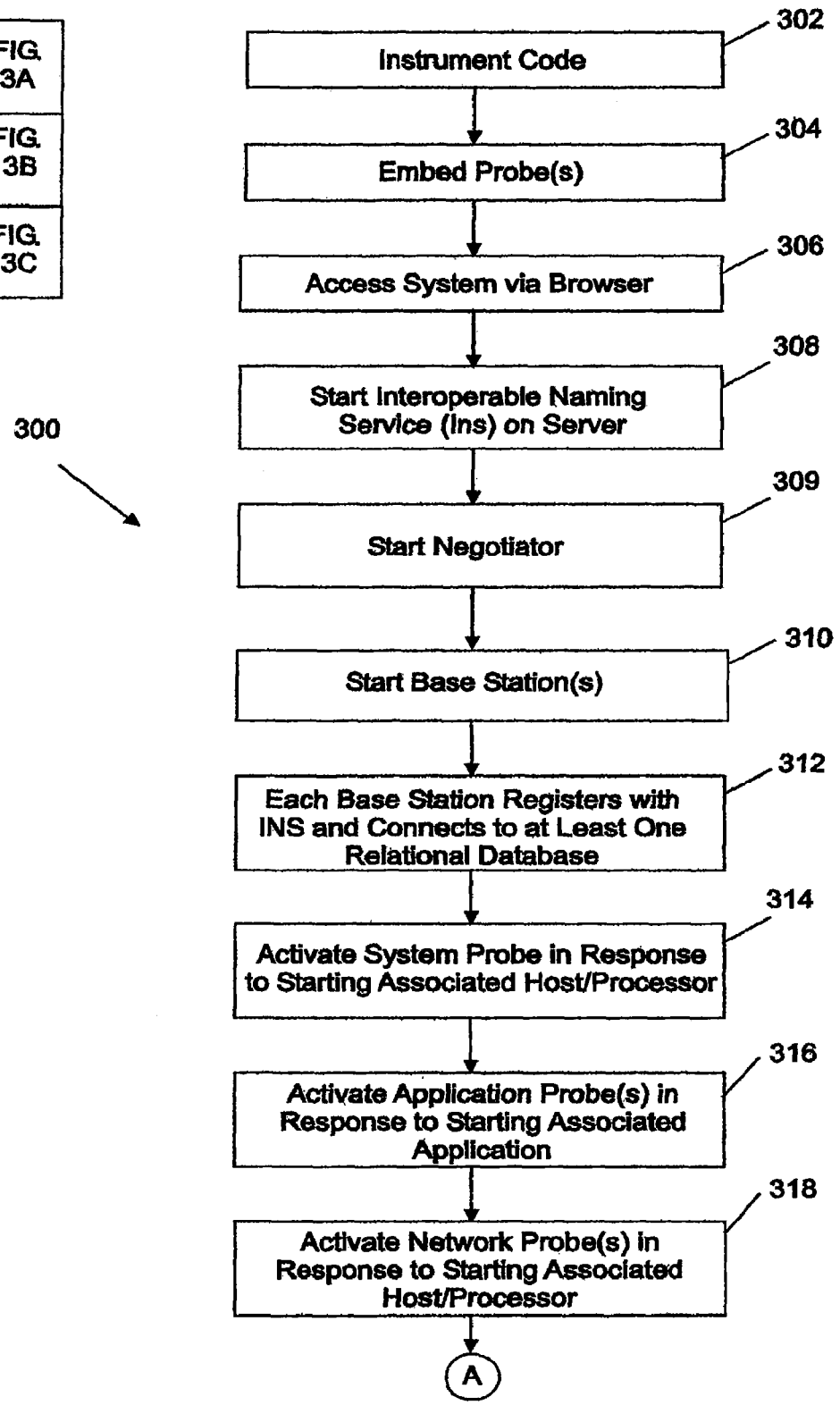

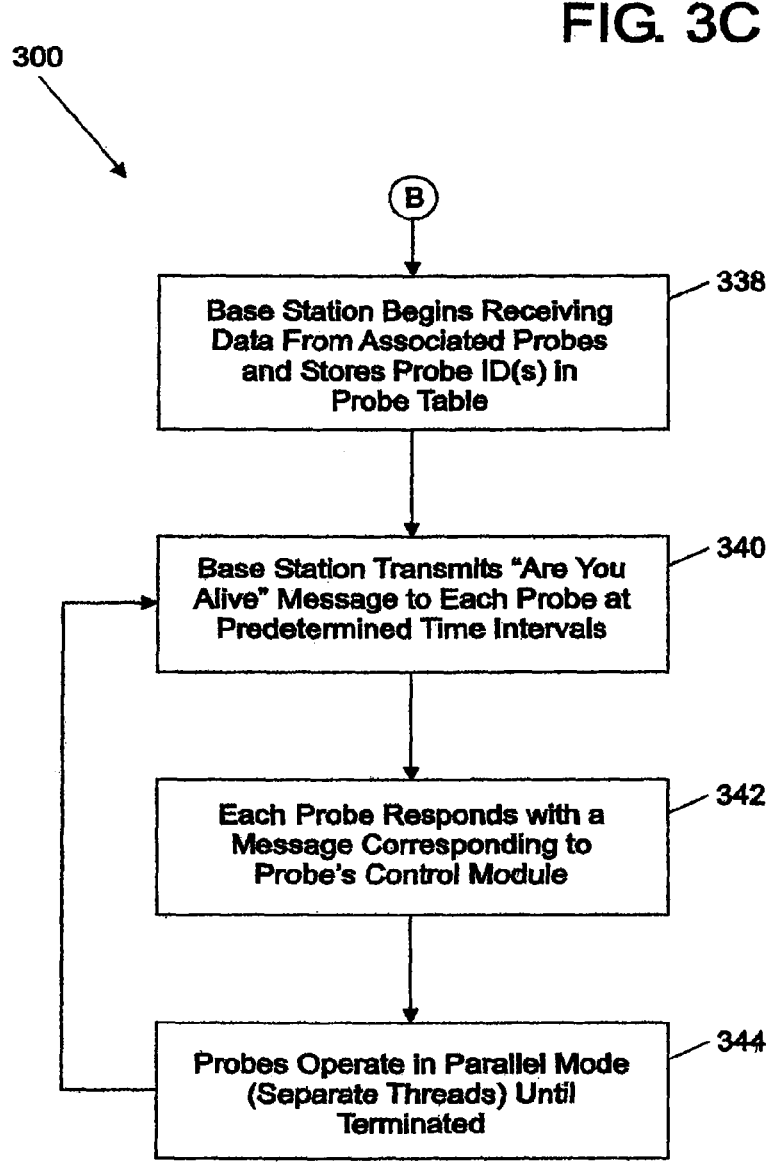

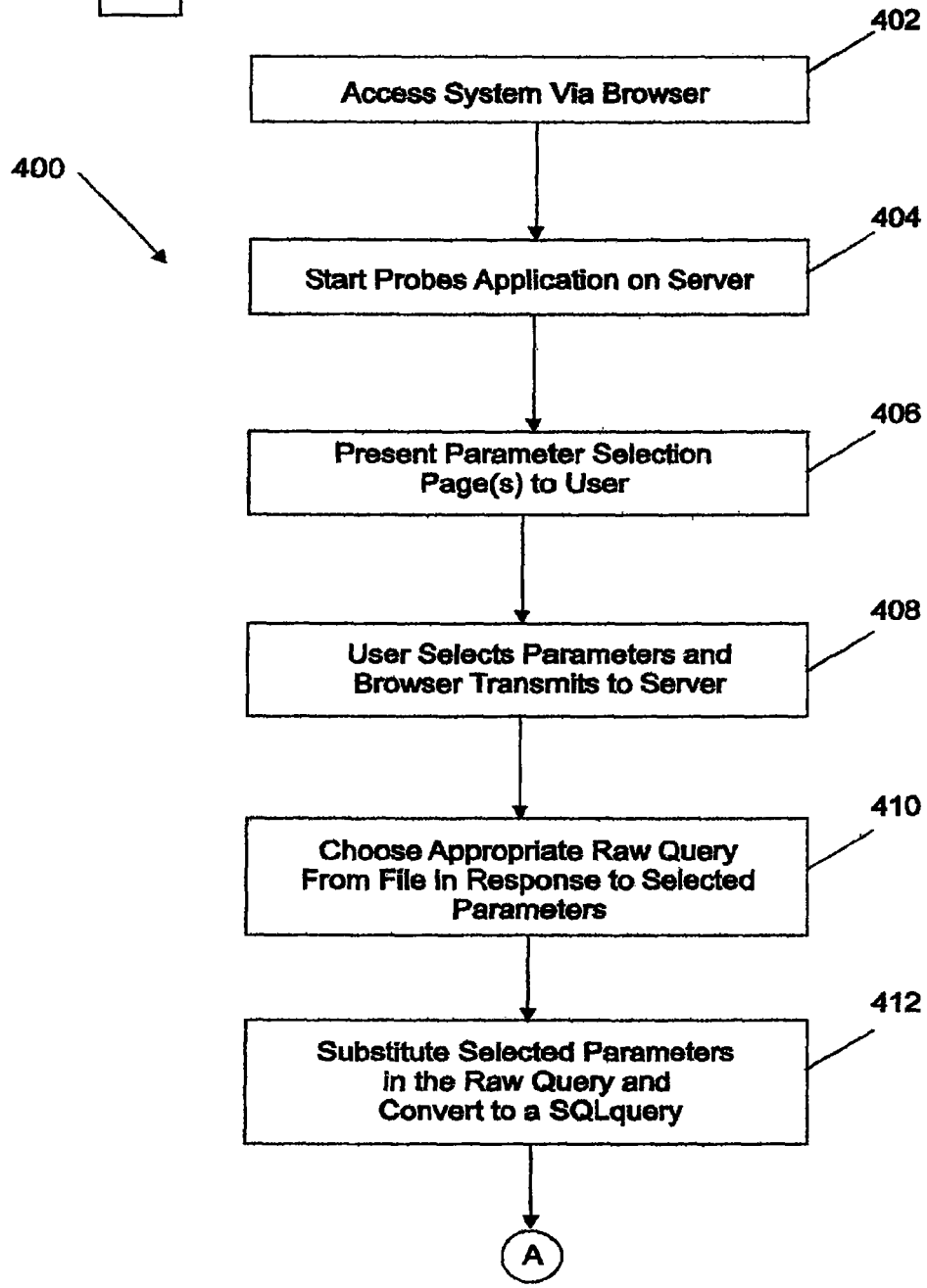

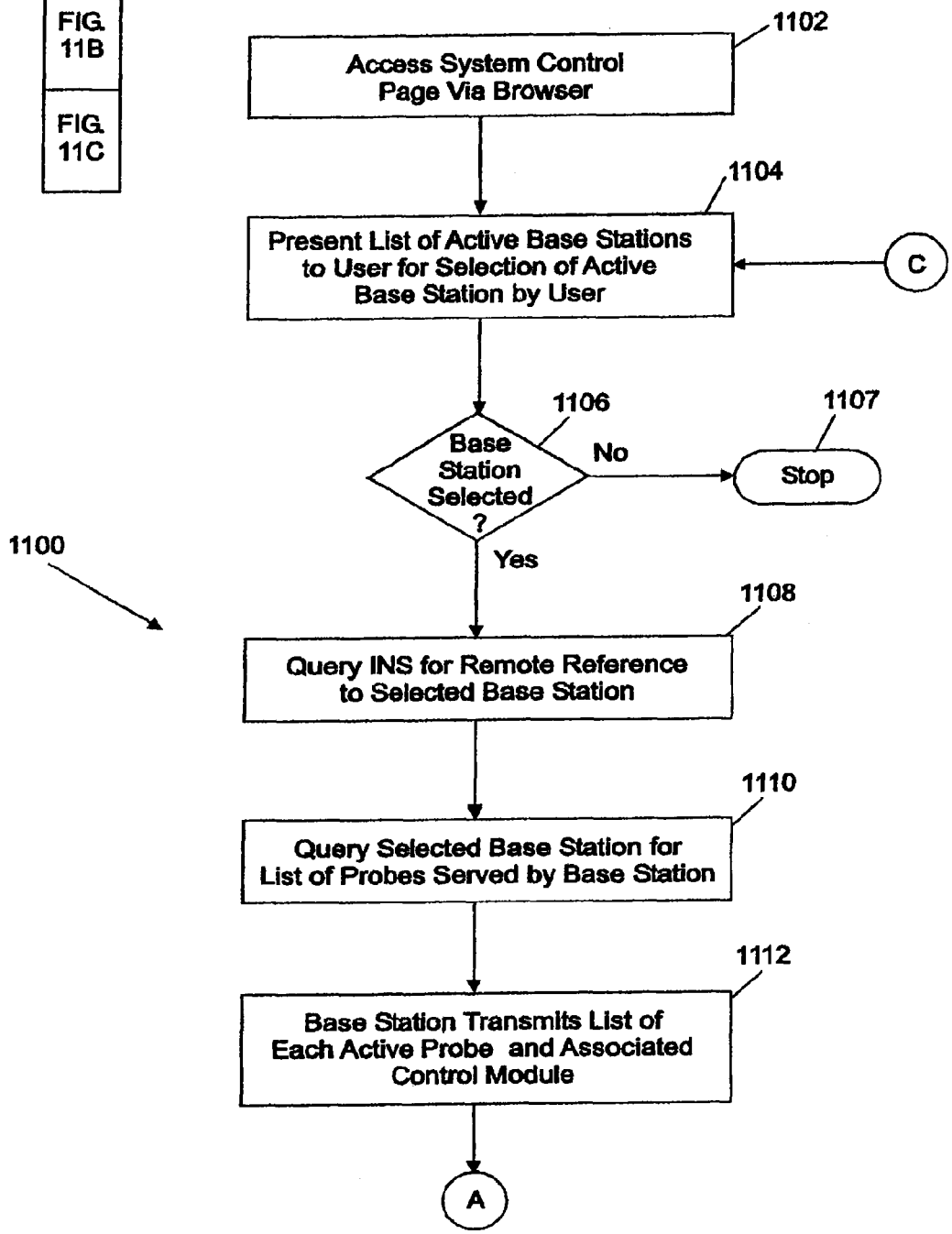

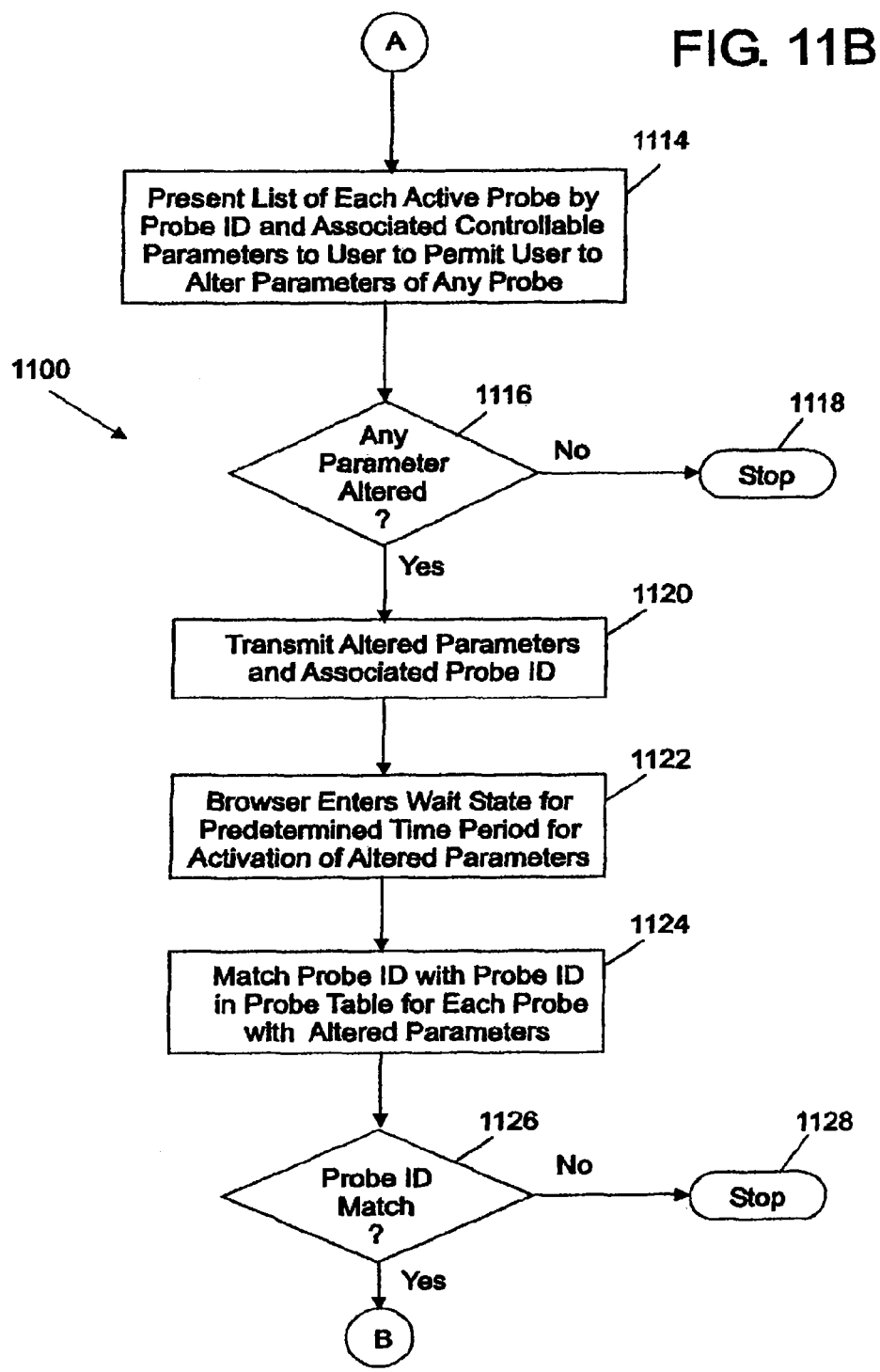

SYSTEM AND METHOD TO MONITOR PERFORMANCE OF DIFFERENT DOMAINS ASSOCIATED WITH A COMPUTER OR NETWORK

CROSS-REFERENCE TO RELATED APPLICATION

This application is a divisional of U.S. patent application Ser. No. 10/608,686 filed on Jun. 27, 2003, the disclosure of which is hereby incorporated by reference herein for all purposes.

CROSS-REFERENCE TO COMPUTER PROGRAM LISTING APPENDIX

A portion of the present disclosure is contained in a compact disc, computer program listing appendix. The compact disc contains the MS-DOS files listed in the following table that includes the title, date of creation and the size in bytes for each file. The contents of each of these files are incorporated herein by reference. Any reference to "the appendix" or any of the files in this specification refer to the files contained on the compact disc.

| TITLE | DATE OF CREATION | SIZE IN BYTES |
| --- | --- | --- |
| ApplicationModel.txt | Jun. 6, 2003 | 1,486 |
| ApplicationProbe.txt | Jun. 6, 2003 | 15,218 |
| Base64.txt | Jun. 6, 2003 | 2,439 |
| BaseStation.txt | Jun. 6, 2003 | 20,958 |
| BusinessTransaction.txt | Jun. 6, 2003 | 899 |
| CFCommand.txt | Jun. 6, 2003 | 1,833 |
| CFStats.txt | Jun. 6, 2003 | 2,383 |
| Chart.txt | Jun. 6, 2003 | 6,532 |
| CircularQueue.txt | Jun. 6, 2003 | 3,045 |
| ColumnChart.txt | Jun. 6, 2003 | 10,227 |
| Command.txt | Jun. 6, 2003 | 1,068 |
| conf.txt | Jun. 6, 2003 | 817 |
| conf1.txt | Jun. 6, 2003 | 2,074 |
| ConfigReader.txt | Jun. 6, 2003 | 3,873 |
| Controllable.txt | Jun. 6, 2003 | 972 |
| DBPool.txt | Jun. 6, 2003 | 8,300 |
| DefaultApplicationModel.txt | Jun. 6, 2003 | 3,012 |
| errorpage.txt | Jun. 6, 2003 | 234 |
| fInternal.txt | Jun. 6, 2003 | 10,791 |
| Grapher.txt | Jun. 6, 2003 | 1,593 |
| GrapherServlet.txt | Jun. 6, 2003 | 1,616 |
| hfiles.txt | Jun. 6, 2003 | 2,461 |
| Identity.txt | Jun. 6, 2003 | 1,063 |
| Instrumenter.txt | Jun. 6, 2003 | 4,126 |
| IOCommand.txt | Jun. 6, 2003 | 5,337 |
| IOStats.txt | Jun. 6, 2003 | 1,545 |
| JDBCQuery.txt | Jun. 6, 2003 | 5,072 |
| kstat.txt | Jun. 6, 2003 | 3,114 |
| KStat1.txt | Jun. 6, 2003 | 2,500 |
| Logger.txt | Jun. 6, 2003 | 917 |
| LoggingLevelEvent.txt | Jun. 6, 2003 | 382 |
| LoggingLevelListener.txt | Jun. 6, 2003 | 227 |
| Menu.txt | Jun. 6, 2003 | 8,005 |
| MissionControl.txt | Jun. 6, 2003 | 1,165 |
| Model.txt | Jun. 6, 2003 | 277 |
| nav.txt | Jun. 6, 2003 | 374 |
| Negotiator.txt | Jun. 6, 2003 | 7,932 |
| NumberSeries.txt | Jun. 6, 2003 | 496 |
| OSCommand.txt | Jun. 6, 2003 | 2,055 |
| OSInternal.txt | Jun. 6, 2003 | 13,256 |
| OSInternal1.txt | Jun. 6, 2003 | 3,577 |
| OSSample.txt | Jun. 6, 2003 | 323 |
| OSStats.txt | Jun. 6, 2003 | 1,234 |
| perfworks_probes_sys_sun_OSInternal.txt | Jun. 6, 2003 | 1,417 |
| Persistable.txt | Jun. 6, 2003 | 730 |
| PieChart.txt | Jun. 6, 2003 | 5,914 |
| Plate.txt | Jun. 6, 2003 | 2,630 |
| PRCommand.txt | Jun. 6, 2003 | 3,704 |
| Probe.txt | Jun. 6, 2003 | 8,015 |
| ProbeConstants.txt | Jun. 6, 2003 | 1,882 |
| ProbeControls.txt | Jun. 6, 2003 | 9,216 |
| ProbeProfile.txt | Jun. 6, 2003 | 1,028 |
| proc.txt | Jun. 6, 2003 | 4,535 |
| Proc1.txt | Jun. 6, 2003 | 2,264 |
| PRStats.txt | Jun. 6, 2003 | 2,794 |
| PRSum.txt | Jun. 6, 2003 | 687 |
| RemoteControllable.txt | Jun. 6, 2003 | 2,183 |
| Selection.txt | Jun. 6, 2003 | 406 |
| Series.txt | Jun. 6, 2003 | 825 |
| SolarisModel.txt | Jun. 6, 2003 | 1,760 |
| SolarisProbe.txt | Jun. 6, 2003 | 6,295 |
| Source.txt | Jun. 6, 2003 | 373 |
| StringSeries.txt | Jun. 6, 2003 | 234 |
| SystemModel.txt | Jun. 6, 2003 | 3,943 |
| SystemProbe.txt | Jun. 6, 2003 | 2,415 |
| TableVisual.txt | Jun. 6, 2003 | 2,041 |
| TimeChart.txt | Jun. 6, 2003 | 10,916 |
| TracedEntity.txt | Jun. 6, 2003 | 1,473 |
| Transaction.txt | Jun. 6, 2003 | 1,903 |
| Transmitter.txt | Jun. 6, 2003 | 13,555 |
| Visual.txt | Jun. 6, 2003 | 2,063 |
| VisualFactory.txt | Jun. 6, 2003 | 9,794 |
| VMCommand.txt | Jun. 6, 2003 | 4,817 |
| VMStats.txt | Jun. 6, 2003 | 2,421 |
| welcome.txt | Jun. 6, 2003 | 184 |
| Workflow.txt | Jun. 6, 2003 | 8,548 |

A portion of the disclosure of this patent document contains material that is subject to copyright protection. The copyright owner has no objection to the facsimile reproduction by anyone of the patent document, the appendix, or the patent disclosure, as it appears in the Patent and Trademark Office patent files or records, but otherwise reserves all copyright rights whatsoever.

FIELD OF THE INVENTION

The present invention relates to computer systems and networks, and more particularly to a system and method to monitor performance of different domains associated with a computer system or network, such as a distributed enterprise system, e-commerce system or business or the like.

BACKGROUND

Monitoring and evaluating operation and performance of computer systems, networks and the like may be important for troubleshooting problems and evaluating ways of improving the operation or performance of the system or network. A typical system 100 for monitoring performance of different domains in a system or network is illustrated in FIGS. 1A and 1B. The domains may include host machines or processors 102, each running an operating system 104, application programs 106 operating on the host machines 104 and similar domains associated with a larger enterprise system, distributed network or the like. The hosts 102 may be web servers, component servers, application servers, database servers or the like. The operating system 104 on each host 102 may be a standard operating system such as Unix, Windows or the like. A number of applications 106 may run on each host 102. The applications 106 may be divided into those applications 108 that are already instrumented or may be capable of being instrumented to collect performance data or metrics and those applications 110 that are incapable of being instrumented. Instrumentation involves the insertion of performance gathering code or data structure within the software of an application, operating system or the like. Instrumentation may be done when the software is originally written or may be inserted later. Operating systems are typically instrumented at the time they are written or developed.

An application agent 112 may be associated with each application 108 that is instrumented to gather performance data. The application agent 112 may collect the performance data associated with the application 108 in which the application agent 112 may be embedded. The application agent 112 may transport the collected data across the network to an application management station 114 for analysis and storage. The application agent 112 and management station 114 are usually proprietary to the vendor providing the tools. Accordingly, the application agent 112 must typically be used in conjunction with the management station 114 provided by the same vendor. Additionally, each vendor typically specializes in a specific domain and provides agents only for that domain.

Application agents 112 transmit the application performance data using Transmission Control Protocol (TCP) to the application management station 114. The TCP connection oriented protocol can utilizes significant resources of the associated application 108 compared to a connectionless protocol, such as user datagram protocol (UDP) or the like. TCP also creates additional dependencies or burdens on the startup of the application 108. Additionally, application agents 112 may not be able to be remotely controlled to alter the level or type of statistics or data being gathered or the frequency at which the data is gathered. Even if the operation of application agent 112 may be altered, such change may necessitate stopping the application 108 to make the change and then restarting the application 108.

A user may access the performance data on the application management station 114 via a proprietary viewing console 116 that is usually supplied by the same vendor as the application agent 112 and management station 114. Multiple consoles 116 may be provided for simultaneous access by multiple users or workstations 120. Each user may also require a vendor specific client program 118 on his workstation 120 to communicate with an associated one of the proprietary consoles 116.

A system agent 122 may be associated with each host 102 to gather data regarding performance of the host 102, operating system 104 and any network associated with the host 102. The system agent 122 may not be associated with an intermediate data storage device and may be directly connected to a proprietary viewing console 124. There may be multiple instances of the proprietary console 124 for access by multiple users or workstations 120. The system agent 122 may be used to resolve performance bottlenecks on a real-time basis. Communication between the system agent 122 and the proprietary console 124 may use Simple Network Management Protocol (SNMP) or TCP, either of which consume data processing resources of the host 102. The user may also need another vendor specific client program 126 to access one of the consoles 124 and retrieve or view the data.

The vendor of the operating system 104 may also provide native system monitoring tools including a native system agent 128 to collect performance statistics related to operation or performance of the host 102, operating system 104 and any network to which the host 102 may be coupled. The native system agent 128 may transfer any collected performance data to a local file system 130. The native agent 128 may collect data in the same address space as the process or operation being monitored and write any collected data directly to the local file system 130. Accordingly, no inter-process communication or protocol may be required. Another client program 132 may be needed on the user's workstation 120, however, to access the collected data on the local file system 130.

Another system agent 134 from a third party vendor may also be associated with each host 102 and associated operating system 104. The agent 134 may be an extensively featured agent and may include other packaged software tools for data collection, trend analysis and modeling. All of which can consume host resources. Like other system agents, such as agents 122 and 128, the agent 134 only collects operating system, host and network data and does not collect application level metrics. The system agent 134 may transmit the collected data to a proprietary central management station 136 provided by the same vendor. The communication link between the system agent 134 and associated management station 136 may use multiple different protocols, such as TCP, SNMP, File Transfer Protocol (FTP) or a vendor proprietary protocol. Either of these protocols can utilize considerable overhead or data processing resources of the host 102.

The central management station 136 may transfer the collected data to a proprietary console 138 for real-time access by a user or to a proprietary file repository 140 for storage and further processing or analysis. There may be multiple instances of the proprietary console 138 for access by multiple users or workstations 120. Another vendor specific client program 142 may be needed on the user's workstation 120 to access the data via the proprietary console 138. Communication between the central management station 136, console 138 and client program 142 may be TCP or a vendor proprietary protocol.

The file repository 140 may store the collected data in a vendor proprietary format. The vendor may provide tools to export the data to a standard relational database (RDB) 144. Communication between the central management station 136, proprietary file repository 140 and relational database may be TCP or FTP. Exporting the data to relational database 144 and the use of TCP and FTP can utilize significant data processing resources.

Each of the system agents 122, 124 and 126 may be needed to collect certain data or metrics or to analyze and present the collected data in a particular way. Accordingly, there may be redundancy in the data collected. Additionally, the resources of the host 102 utilized by the multiple agents 124-126 running concurrently can be significant.

In summary, current performance monitoring and analysis systems may be complex requiring multiple components or tools for a user to retrieve, store and present performance data from different domains, such as applications, operating systems, hosts, networks and other domains. The multiple tools may come from an array of different vendors and utilize significant processing resources. There is no mechanism to integrate and consolidate the performance data collected by the different vendor tools and the data may be redundant and stored in inconsistent formats. Further, the data collection agents are incapable of being controlled dynamically and require an application or operating system domain to be shut down and restarted to alter the operating parameters of the agents. The multiple, different proprietary viewing consoles and client programs on each user's workstation 120 can impose administrative constraints and requirements, such as maintenance, multiple user licenses and training to use and maintain the tools.

Accordingly, there is a need to provide a system and method to monitor performance that utilizes minimal resources and can integrate or consolidate and display the data collected from different domains simultaneously. There is also a need to provide a system and method to monitor performance that permits dynamic control of the tools without affecting the operation of the different domains. There is also a need to provide a system and method to monitor performance that uses a standard system-wide database for storing collected performance data and stores the data in a standard format. There is a further need to provide a system and method to monitor performance that uses tools written in a standard programming language to collect, analyze and present the collected data to minimize administrative constraints and requirements.

SUMMARY

In accordance with an embodiment of the present invention, a system to monitor performance may include at least one probe to collect data related to performance of an associated domain. The system may also include at least one base station to receive data from associated ones of the at least one probe.

In accordance with another embodiment of the present invention, a system to monitor performance may include at least one probe of a plurality of probes to collect data related to performance from each of a plurality of domains. At least one base station may receive data from associated ones of the plurality of probes and may control operation the probes associated with the base station. At least one database may store the collected data. A server may interface between a browser and the at least one base station and the server may retrieve and display selected data from the at least one database in response to a query.

In accordance with another embodiment of the present invention, a method to monitor performance may include collecting data related to performance of different domains in a system. The data collected from each of the different domains may be correlated over a common time period and the data collected for selected ones of the different domains may be displayed together in relation to the common time period.

In accordance with another embodiment of the present invention, a method to monitor performance may include accessing a probes application on a server via a browser to activate the probes application. The method may also include presenting at least one parameter selection page for a user to select parameters related to performance data in response to accessing the probes application. The method may further include retrieving performance data in response to the selected parameters.

In accordance with another embodiment of the present invention, a computer-readable medium having computer-executable instructions for performing a method that may include collecting performance data for different domains in a system. The method may also include correlating the data collected from each of the different domains over a common time period; and displaying the data collected for selected ones of the different domains together in relation to the common time period.

In accordance with another embodiment of the present invention, a method of making a system to monitor performance may include embedding a plurality of probes with at least one probe being embedded with each of a plurality of domains to collect performance data from the domain. The method may also include providing at least one base station to receive data from associated ones of the plurality of embedded probes.

BRIEF DESCRIPTION OF THE DRAWINGS

FIGS. 1A and 1B are a block diagram of a prior art system to monitor performance of different domains associated with a computer system or network, such as a distributed enterprise system or the like.

FIGS. 2A, 2B and 2C are a block diagram of a system to monitor performance of different domains associated with a computer system or network in accordance with an embodiment of the present invention.

FIGS. 3A, 3B and 3C are a flow chart of a method to initialize and activate a system to monitor performance of different domains in accordance with an embodiment of the present invention.

FIGS. 4A and 4B are a flow chart of a method to request and display performance data for different domains in accordance with an embodiment of the present invention.

FIGS. 11A, 11B and 11C are a flow chart of a method to dynamically change the type and frequency of the data being collected by probes in accordance with an embodiment of the present invention.

DESCRIPTION OF THE INVENTION

The following detailed description of preferred embodiments refers to the accompanying drawings which illustrate specific embodiments of the invention. Other embodiments having different structures and operations do not depart from the scope of the present invention.

Figure 1B:
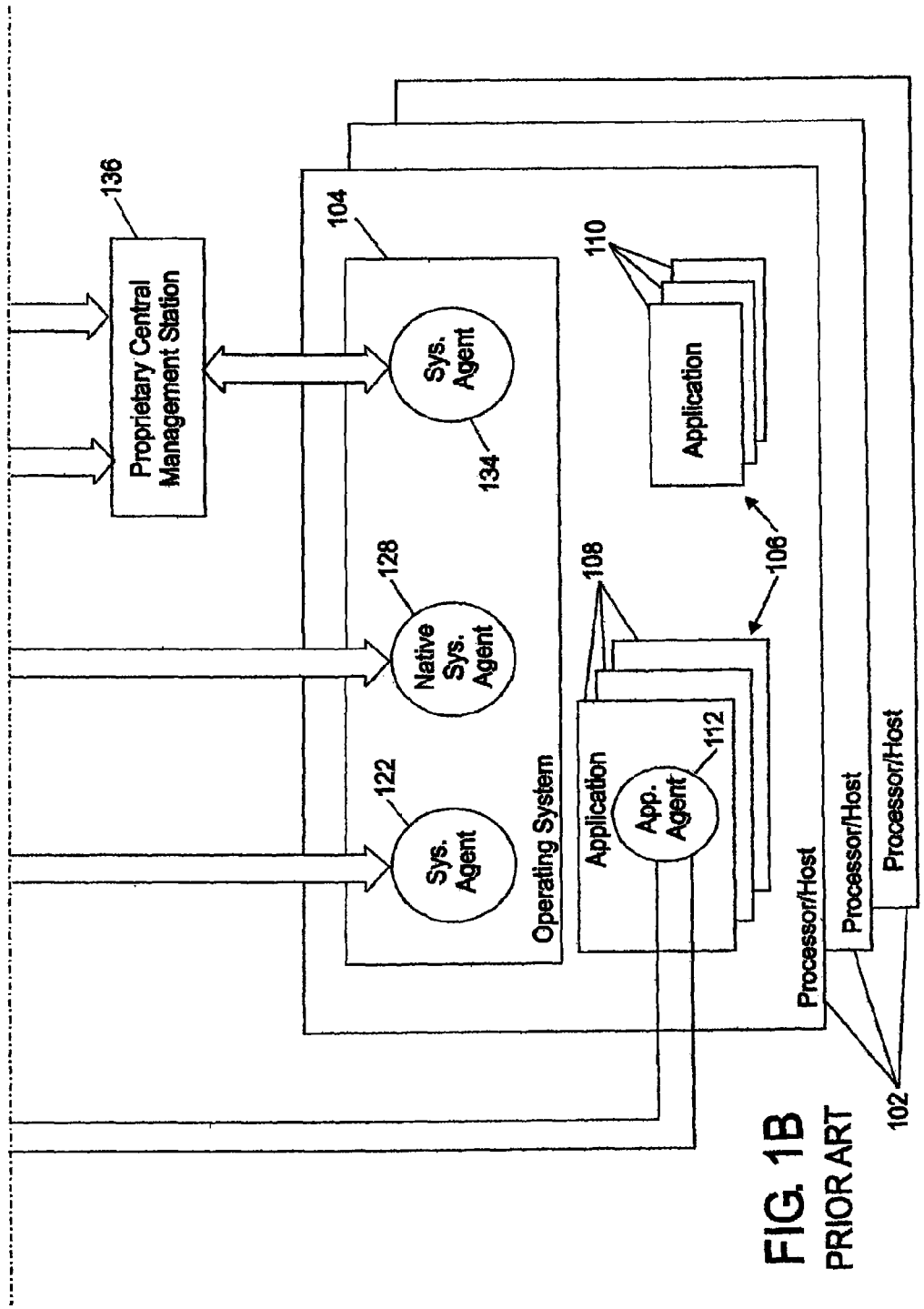
Figure 2B:
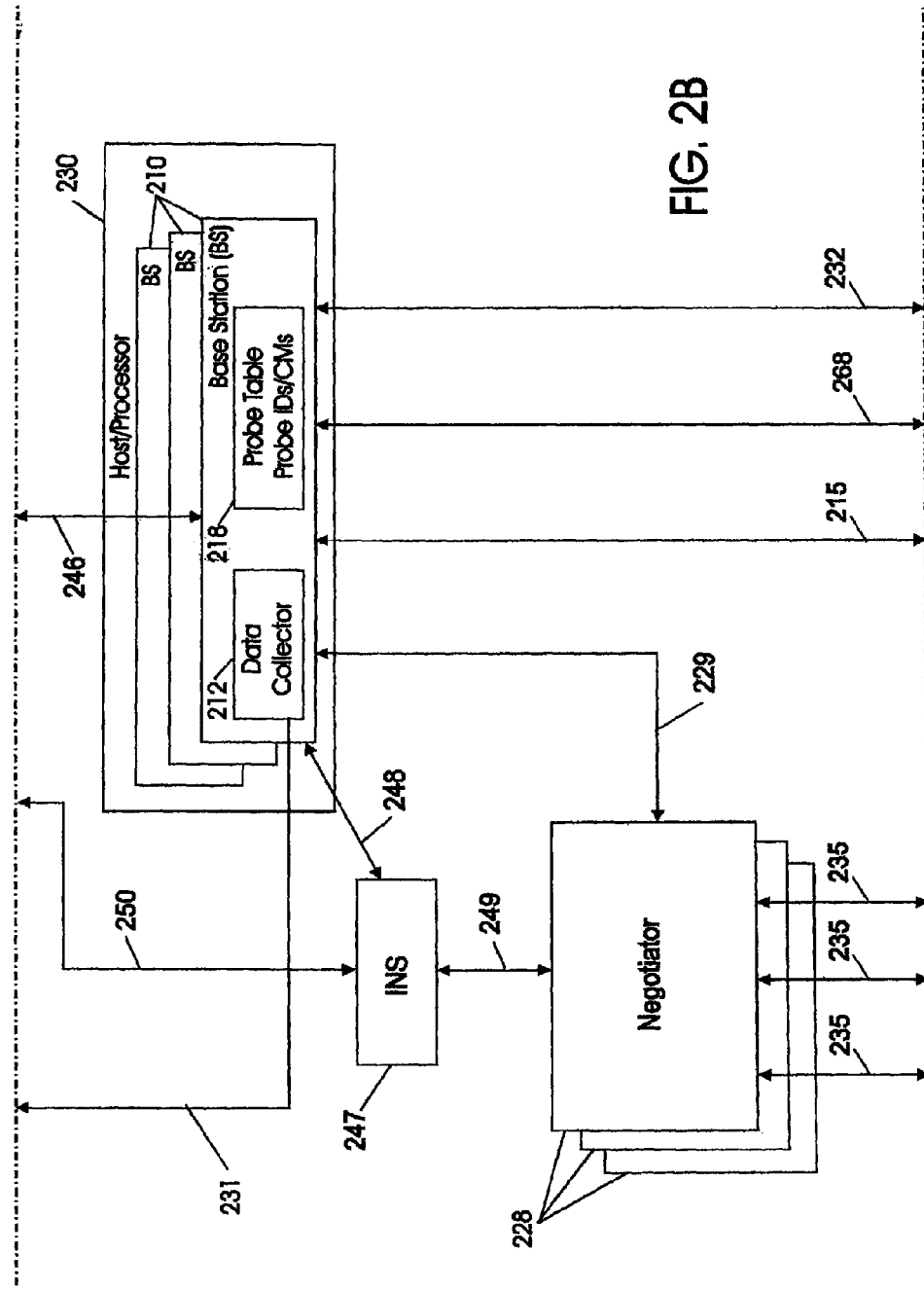
Figure 2C:
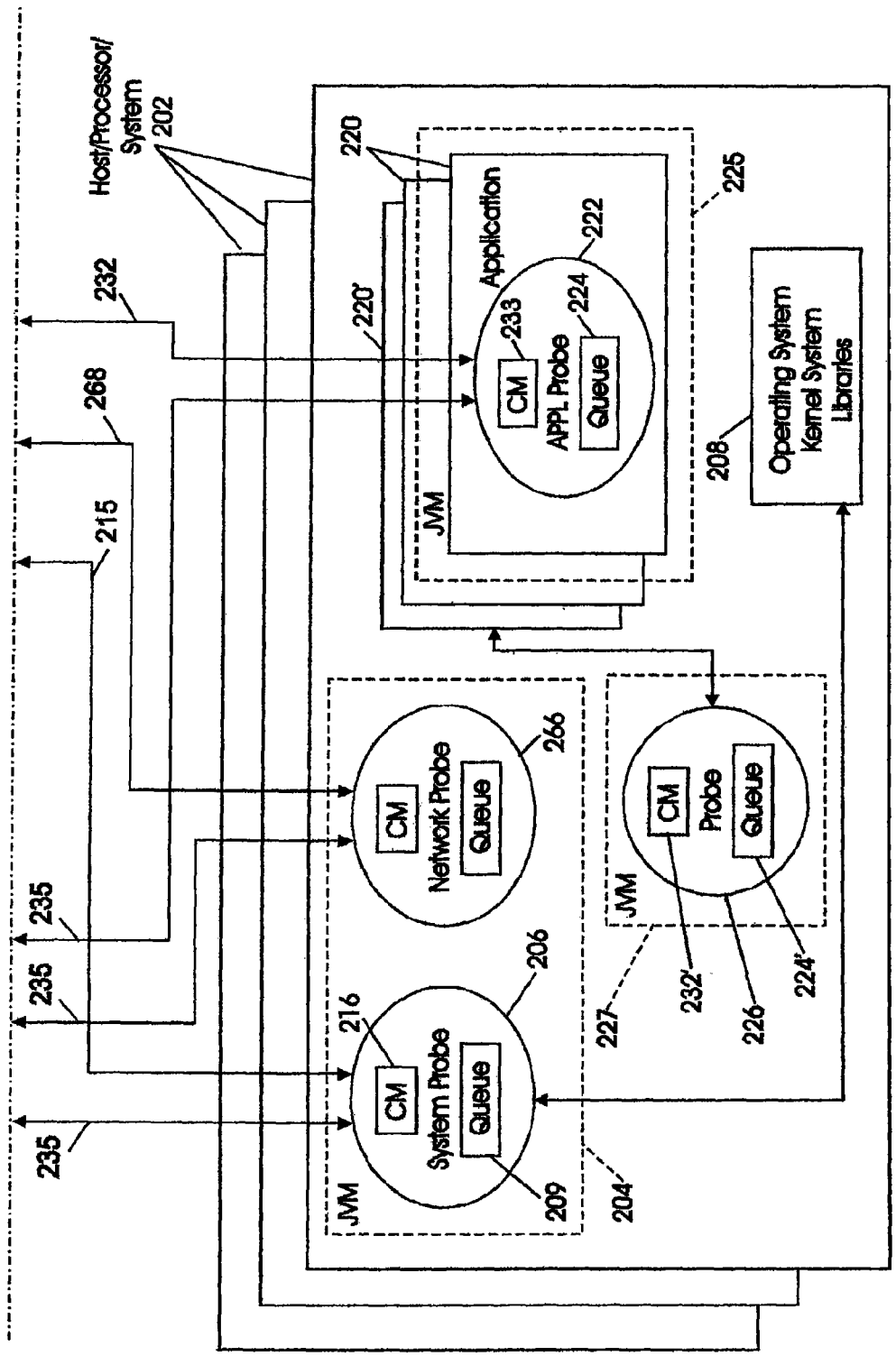

FIGS. 2A, 2B and 2C are a block diagram of a system 200 to monitor performance of different domains associated with a computer system or network in accordance with an embodiment of the present invention. The computer system or network 200 may include a plurality of host machines 202 (FIG. 2C), systems or processors that may form a distributed enterprise network or the like. Each host 202 may be a web server, component server, application server, database server or the like. Each host 202 may run a standard operating system, such as Unix™, Windows™ or the like, that may include a Java Virtual Machine (JVM) 204.

The system 200 may include a system probe 206 running on each host machine 202. The system probe 206 may collect operating system data or metrics, host performance or operational data and network data or metrics. For example, the system probe 206 may collect memory related data or statistics, input/output (I/O) data or statistics, process statistics, configuration statistics and the like. The memory related statistics may include the number of processes ready to run, number of processes waiting, amount of available memory, pages paged in per second, pages paged out per second, system calls, device interrupts, CPU utilization, wait time, idle time and the like. I/O statistic may include I/O devices, number of reads and writes, average wait time, average service time, average response time wait percent, run percent, real service time, random access time and the like. The process statistics may include an identification assigned to a particular process by the operating system; command parameters; command arguments; virtual size of a particular process; percentage of CPU used by a process; number of system calls made by a particular process; number of minor page faults in a process; number of voluntary and involuntary context switches made by a process; number of characters written and read by a process; number of open sockets; number of open regular sockets; total number of regular files; total number of file descriptors used and the like. The configuration statistics may include amount of memory installed, number of CPUs online, maximum number of processes allowed to run, maximum number of files allowed to be open, maximum number of streams allowed to be open, memory page size, maximum number of pages created, number of used pages, operating system name and release number, machine architecture and hostname and the like. The preceding data or statistics that may be collected by a system probe are merely examples and the statistics that may be collected may be different for different operating systems. Examples of system probes 206 may be IBM® Tivoli performance management tools, PATROL® products by BMC Software, Inc. of Houston, Tex., eHealth products by Concord® of Marlboro, Mass. and the like.

Each system probe 206 may be written in Java™ programming language or the like and may use a Java Native Interface (JNI) to look into the operating system kernel data structures or kernel system libraries 208 to access performance metric data. The kernel data may be acquired in multiple threads using a single process address space to reduce the overhead of creating multiple processes.

The performance data collected by the system probe 206 may be stored in a queue 209 that may be part of the system probe 206. The queue 209 may be a circular queue or the like of a predetermined capacity. The performance data may be transmitted from the queue 209 to a base station (BS) 210 shown in FIG. 2B. A data collector 212 in the base station 210 may receive the performance data. The data collector 212 may include a data structure to receive the system performance data from the system probe 206 and convert the data to a format that may be stored in a database 214 (FIG. 2A), such as a relational database, with a corresponding time reference. Each system probe 206 may transmit signals to the base station 210 over an associated communication link or channel 215 using Transmission Control Protocol (TCP). The base station 210 may transmit signals to the system probes 206 over channel 215 or over a different link or channel using User Datagram Protocol (UDP) to minimize the overhead and conserve data processing resources of the host 202 associated with the system probe 206.

The system probe 206 may include a control module (CM) 216 that may store or record current operational parameters for the system probe 206. Examples of the operational parameters may include the nature or type of data or metric to be gathered by the probe 206 and a frequency at which the probe 206 may gather the data or metrics. A copy of the control module 216 may be kept at the base station 210. The base station 210 may include a probe table 218 that may contain a probe identification and a copy of the corresponding control module 216 for each probe 206 served by the base station 210. The copy of the control module 216 may be used by the base station 210 to remotely control operation of the system probe 206. Parameters in the control module 216 may be dynamically regulated without affecting the operation of the host 202 and its operating system. The base station 210 may periodically ping or signal the system probe 206 to check the status or health of the probe 206. The probe 206 may respond by transmitting a signal corresponding to the control module 216 of the probe 206. The base station 210 may configure the copy of the control module 216 and send the new control module 216 to the probe 206 to alter the probes operation.

A number of applications 220 may run on each host machine 202 as illustrated by a stack of applications 220 in FIG. 2C. The applications 220 represent software that may be written to operate on the hosts 202 and that may be capable of being instrumented to include performance gathering code. Alternatively, an instrumented Java® Virtual Machine (JVM), such as JVM 204, may be run in conjunction with the application 220 to facilitate gathering performance data. However, using an instrumented JVM may not be desirable in production environments because the JVM may cause the application 220 to operate substantially slower.

At least one application probe 222 may be embedded with each application 220 to collect application level data from the associated host application 220. A queue 224, such as a circular queue or the like, of a predetermined capacity may be provided to store the performance data collected by the application probe 222. The queue 224 may be part of the application probe 222. If the application 220 is a Java® type application, the application 220 may run inside a Java® Virtual Machine (JVM) 225 by virtue of being a Java® application. If an application 220' is not a Java® based application, such as Oracle, IBM®MQ, WebSphere® MQ or other non-Java based application, a probe 226 that may have an architecture resembling a system probe, like system probe 206 or network probe 266, may be associated with the non-Java based application 220'. The probe 226 may reside in its own JVM 227 by becoming a Java® application and may communicate with the non-Java application 220' under measurement via Java® Native Interface (JNI) libraries (in the case of system probes) or Interprocess Communications (IPC) or the like. The network probe 266 may be coupled to the base station 210 by an associated communication channel 268.

Examples of application probes 222 may be $i^3$ and Insight products or probes by Precise Software Solutions of Westwood, Mass., Optimizeit™ Suite of products by Borland of Scotts Valley, Calif., Introscope® line of products by Wiley Technology of Brisbane, Calif. and the like. The data collected by the application probes 222 and 226 may include transaction statistics, trace statistics or the like. Transaction statistics may include response times, number of calls, heap size and the like. Trace statistics may include checkpoint response times, heap size and overall transaction response times.

The data may be transferred from the queue 224 to the data collector 212 in the base station 210 on a low priority thread relative to normal operations of the host 202. A lightweight User Datagram Protocol (UDP) may be used for communications between the base station 210 and the queue 224 and application probe 222. The low priority thread may be scheduled when higher priority threads of the host operating system are not doing any useful work. Therefore, the operational overhead of the application probes 222 is minimal. The base station 210 may include a data structure to request transfer of any data stored in the queue 224 at predetermined time intervals. Any data in the queue 224 may then be transferred to the base station 210 or data collector 212, in response to a data request, during time intervals of internal host resource utilization that may be below a predetermined level. The data structure to periodically request transfer of any data stored in the queue 224 may be part of the data collector 212.

Each base station 210 may be a Java® software program. A plurality of base stations 210 may be provided for scalability as illustrated by a stack of base stations 210 in FIG. 2. A negotiator 228 may be coupled to the base stations 210 by an associated communication link or channel 229. The negotiator 228 may balance a workload between the plurality of base stations 210 or may balance a quantity of probes served by each base station 210. The probes 206, 222 and 226 may bootstrap with the negotiator 228 when the probes start up and may negotiate communication parameters. There may be multiple instances of the negotiator 228 as illustrated by the stack in FIG. 2B for purposes of scalability. Each of the negotiators 228 may run on a separate host machine (not shown in FIG. 2B) or a selected number of negotiators 228 may run on each host machine, processor or server. The negotiators 228 may be part of the same subnet or communication network as the probes 206, 222 and 226 which may be illustrated by communication links or channels 235 in FIGS. 2B and 2C between the negotiator 228 and the probes. The base station 210 may be part of the same subnet as the negotiator 228 and probes 206, 222 and 226 or may be on another subnet. Even though the base station 210 may be remotely located on another subnet, the router or switch connecting the two subnets may allow unrestricted flow of UDP and TCP packets. The appendix of this application includes an example of source code that may be used in implementing the features of the base station 210 and negotiator 228.

The base stations 210 may each run on a physical host machine or processor 230 that may be separate from the hosts 202 to conserve resources in the hosts 202 and provide more efficient operation. The base stations 210 in FIG. 2B are shown running on the same processor 230 for purposes of clarity; although each base station 210 could run on a different processor 230 or a predetermined number of base stations 210 could run on each processor 230. The base stations 210 may receive data from both system probes 206 and application probes 222. Data received by the base station 210 from the probes 206 and 222 may be parsed and transmitted to one of the relational databases 214 using Java® Database Connectivity (JDBC) or the like. A communication channel 231 between the base stations 210 and the relational database 214 may use TCP.

A bi-directional communication channel 232 between each application probe 222 and an associated serving base station 210 may use UDP. The use of UDP reduces the resource usage in production and the UDP communication channel 232 facilitates dynamically controlling the application probes 222 without affecting the operation of the associated applications 220. Application probes 222 may be dynamically controlled, similar to system probes 206, without shutting down or affecting the host program or application 220 in which they are embedded. Accordingly, application probes 222 may stop or start collecting statistics or data at application run time and software components do not need to be re-started. Even the type of performance data gathered may be dynamically regulated or altered. Similar to system probes 206, each application probe 222 may include a control module 233. A copy of the control module 233 may be kept at the base station 210 serving the application probe 222. The control module copy may be stored in the probe table 218 along with a corresponding probe identification. The base station 210 may include a data structure to also periodically ping or transmit a signal to the application probe 222 to check the status or health of the probe 222. The probe 222 may respond with a signal corresponding to the probe's control module 233. The base station 210 may re-configure the operating parameters in the copy of the control module 233 and send the new control module configuration to the application probe 222 to control operation of the application probe 222. The application probe 222 may then alter the parameters by which it collects performance data in response to the new control module configuration.

A user may access the system 200 via a web browser 234. The web browser 234 may run on a processor 236 of a workstation 238. Multiple users may access the system 200 simultaneously as represented by the multiple workstations 238 in FIG. 2. Each workstation 238 may include a display 240 to present performance results to the user and input devices 242, such as a keyboard, pointing device, disk drives and the like, to permit the user to control operation of the system 200.

Figure 11C:
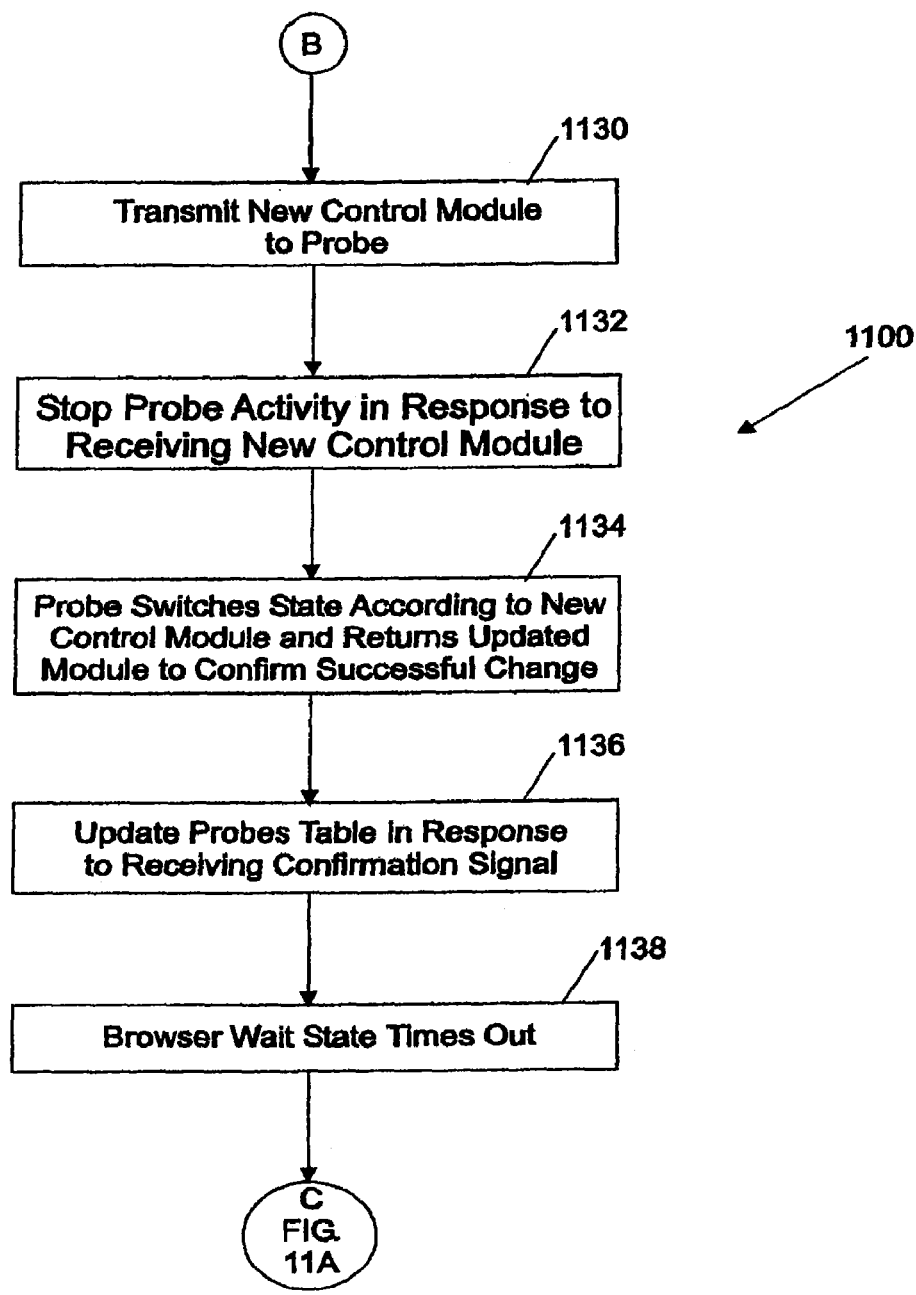

As described in more detail with respect to FIGS. 11A-11C, a user may control the operation of the system probes 206 and application probes 222 by selecting new operating parameters for their respective control modules 216 and 233. The new parameters may be selected by the user via the web browser 234. The display 240 may display a web page including a form for the user to select or enter new parameters. The user may enter the new configuration or operating parameters into the web page using the input devices 242. The control modules 216 and 233 and associated copies may be updated in response to the user selecting or entering the new parameters to control the operation of the probes 206 and 222. The web browser 234 may transmit the parameters entered by the user to an Internet type server or web server 244 which in turn may transmit the parameters to the base station 210 serving the probes 206, 222, or 226 for which the parameters are being changed. The base station 210 may send the operating parameters to the probe or probes 206, 222, or 226 being controlled using UDP. The base station 210 may store the new operating parameters in the probe table 218 with the probe identification for the probe or probes 206, 222, or 226 receiving the new operating parameters. A communication channel 245 between the web browser 234 and the web server 244 may use hyper text transfer protocol (HTTP) or the like. A communication channel 246 between the base station 210 and the web server 244 may use Internet InterOrb protocol (IIOP)

or the like with remote method invocation (RMI) to support distributed object computing in a Java® environment.

An Interoperable Naming Service (INS) 247, name service or the like may register each live or active base station 210 and may assign an identifier to each base station 210. The INS 247 may be coupled to the base stations 210 by one or more communication channels or links 248 and to the negotiators 228 by one or more communication channels 249. The INS 247 may also be coupled to the server 244 by a communication channel 250. The INS 247 may operate on a separate host machine (not shown in FIG. 2), processor or server relative to the server 244, negotiator 228 and base station 210.

The server 244 may be enabled with a Java® Server Page (JSP) engine 251 or the like and a Java® Servlet engine 252 or the like for image streaming. A probes application 253 may run on the JSP engine 248. The probes application 253 may include a data structure for overall operation of the system 200. The probes application 253 may include a data structure for controlling collection of data by the probes 206 and 222, executing queries and retrieving data from the databases 214 and displaying performance results and web pages to interface with the user. The appendix to this application includes examples of source code listings that may be used to implement the features of the server 244 and probes application 253. The Java® Servlet engine 252 or a front-end web image streaming application may stream out live or real-time trends and reports of operation or performance of the different domains that may be presented to the user in GUIs or web pages on display 240. The probes application 253 may produce trends and reports by executing queries on the collected data stored in relational database or databases 214. A communication channel 254 between the server 244 and databases 214 may use TCP. Multiple relational databases 214 may be multiplexed by a multiplexer (MUX) 256 into a single TCP connection 258 to the server 244.

A query file 260 may store predetermined raw queries to retrieve selected data from the data stored in the database or databases 214. The predetermined raw queries may be structured query language (SQL) queries, extensible mark-up language (XML) queries or similar queries to retrieve selected data from the relational database or databases 214. The probes application 253 may include a data structure to choose an appropriate raw query from the query file 260 based on search parameters entered by a user. A link may be provided to a universal resource locator (URL) containing a path to a chosen query in the file 260 in response to the parameters selected or entered by a user. The link may be provided by a data structure in the server 244 or the probes application 252. The probes application 253 may also include a data structure to substitute the search parameters entered by the user into the chosen query and to execute the completed query on the databases 214 to retrieve the performance data corresponding to the search parameters and the completed query. The results from executing the query may be displayed to the requesting user on display 240. Data related to performance of one or more domains collected by probes 206 and 222 may be integrated or consolidated and displayed together over a predetermined time interval. The parameters selected by the user may include the domains in which probes 206 and 222 are embedded and the time interval over which data is to be retrieved and displayed. The probes application 253 and image streaming servlet 252 may include data structures to periodically retrieve updated data related to one or more domains and to display the updated data to provide live or real-time trends or reports of performance or operation. As previously described, the appendix to this application includes examples of source code listings that may be used to implement the features of the probes application 253 and image streaming servlet 252.

The web browser 234 permits the user to view information generated from the performance data or metrics. The browser 234 provides the user an interface for accessing all performance data to present a consolidated and integrated view of the operation and performance of applications 220 as well as the systems or hosts 202. Metrics or data from new probes for different domains, such as a database probe 264 or a separate network probe 266 may be plugged into the system 200 and the performance data may be seamlessly integrated and consolidated on the same browser 234 along with other data from other domains. Data in trends and reports may be presented and correlated with time so that a user can simply demand the status of an entire distributed system over a user defined time interval on the web browser 234 of the user's choice. The user may be presented with graphs, charts and analysis units from the application 220, system or host 202, network 266, database 264 and other domains simultaneously.

The system 200 may be useful for many different types of users. For example, users that test applications on different systems may need to access application and system performance data or metrics. The performance data or metrics may be used to evaluate the applications performance and to make improvements. Users that write code may need access to application metrics and may be restricted access to the performance data in production. Users that administer host machines may need to acquire operating system and network data for the host machines and the networks that connect those machines. Users that administer the network or system administrators may need to observe operating system and network data for the host machines and the networks that connect those machines. Users with overall distributed system responsibility may need to view application, system, network, database and web metrics or data simultaneously to identify bottlenecks, and plan for capacity needs of the enterprise or business.

The system 200 may be an open architecture and new probes to monitor new and different domains may be added seamlessly and integrated easily and efficiently into the system 200.

Figure 3B:
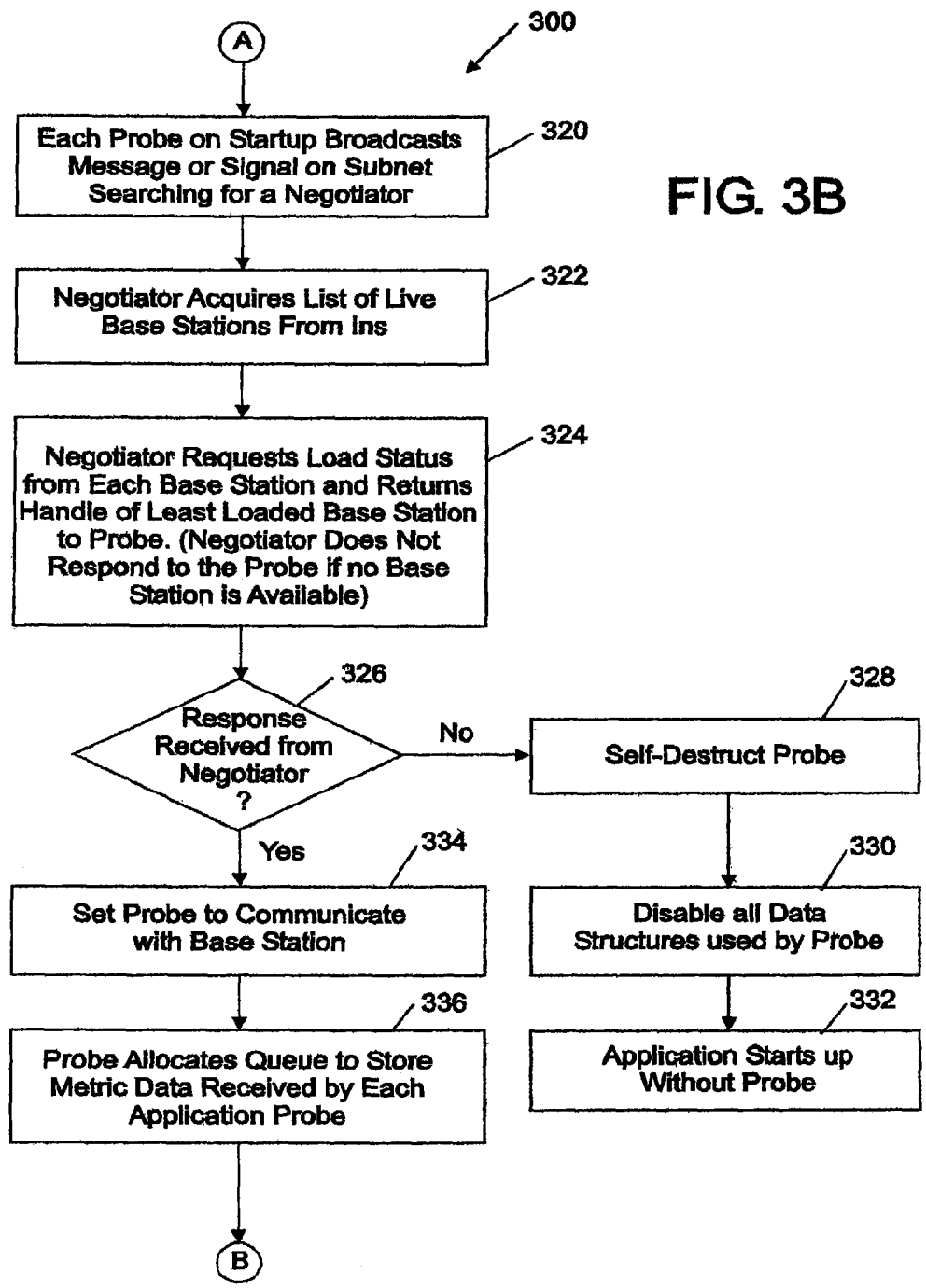

FIGS. 3A, 3B and 3C are a flow chart of a method 300 to initialize and activate a system, such as system 200 of FIG. 2 or the like, to monitor performance of different domains in accordance with an embodiment of the present invention. At least portions of the method 300 may be embodied in a data structure in system 200 or probes application 253 in FIG. 2. In block 302, code or software of domains from which performance data or metrics may be collected may be instrumented. As previously discussed, instrumentation may involve inserting specific performance gathering code into code or software to be measured. Instrumentation may be done at the time the original code is written or may be inserted later. Operating system code is typically instrumented at the time the code is written. The performance code may be inserted into the source code or into the byte code of an application in Java®. In block 304 probes, such as the system probes 206 or application probes 222 or the like, may be embedded in the domain, such as an operating system, application or other domain. The probes may be written in Java® or a similar language and may be controlled as previously discussed to gather a different level or type of data and at different frequencies.

In block 306, the system may be accessed via a browser, such as the web browser 234 in FIG. 2. In block 308, an interoperable naming service, such as INS 247 in FIG. 2 or the like, may be started on an individual machine or processor in response to a user accessing the system 200 via the browser 234. A negotiator, similar to negotiator 228 in FIG. 2 or the like, may be started in block 309. In block 310, a base station or stations that may be similar to the base stations 210 in FIG. 2 may be started in response to the browser accessing the system. Each base station may register with the INS and connect to at least one relational database in block 312.

In block 314, a system probe may be activated in response to starting an associated host, processor or system in which the system probe may be embedded. Each system probe may be similar to system probe 216 discussed with respect to FIG. 2 to gather system and network operation or performance data. One instance of a system probe may be started on each host. In block 316, at least one application probe may be automatically activated in response to starting an associated application in which the at least one system probe is embedded. The application probe may be similar to the application probe 222 in FIG. 2 to collect operation or performance data related to the application in which the probe is embedded. In block 318, any network probes may be activated in response to starting an associated host, processor or system to gather network data. System probes may include a data structure to also gather network data as discussed above. Similarly, any other probes in other domains, such as database probe 264 in FIG. 2 may be started in response to a server or base station communicating with the database.

In block 320 (FIG. 3B), each probe upon startup may broadcast a message or signal on a subnet to search for a negotiator, such as negotiator 228 in FIG. 2B. The negotiator may acquire a list of live or active base stations from the Interoperable Naming Service (INS), such as INS 247 in FIG. 2, in block 322. The negotiator may request a load status from each base station and may return a handle of the least loaded base station to the probe in block 324. If there are no base stations available to serve the probe, the negotiator may not respond to the probe. In block 326, if the probe does not receive a response from the negotiator within a predetermined time period, the method 300 may advance to block 328. In block 328, the probe may self-destruct or be deactivated. In block 330, all data structures in the domain associated with the self-destructed probe may be disabled to free-up resources within the domain for other functions and to improve operational efficiency of the domain. In block 332, the application may be started up without the probe.

If a response is received from the negotiator by the probe in block 326, the method 300 may advance to block 334. In block 334, the probe may be set to communicate with the base station using the handle in the response from the negotiator returned to the probe in block 324. In block 336, the probe may allocate a queue to store data received by each probe for an interim period of time until a low priority thread can transfer the collected data to a database as previously discussed. The probe may allocate a circular queue in the host JVM for the probe. In block 338 (FIG. 3C), the base station may begin to receive data from the associated or attached probes and may store an identifier for the probe along with a copy of the probe's control module containing changeable control parameters for the probe. The probe ID and control module may be stored in a probe table, such as probe table 218 discussed with respect to FIG. 2.

In block 340, the base station may transmit an "are you alive" message, signal or the like to each associated probe at predetermined time intervals. In block 342, each probe may respond with a message corresponding to a state of the probe's control module. The base station may do a comparison of the message from the probe to the control module copy stored by the base station to confirm there are no problems. In block 344, the activated probes that have linked to a base station may operate in a parallel mode on separate threads until terminated by some event, such as terminating the application, shutting down the host or system in the case of a system probe or a user selecting a parameter to discontinue operation.

The method 300 may be embodied in a computer readable medium or electronic readable medium, such as a memory 268 (FIG. 2) or the like, having computer-executable instructions for performing the method 300. The computer readable medium may include any type of medium, such as electronic, magnetic, optical, electromagnetic, infrared, semiconductor or the like. The appendix to this application includes examples of source code that may be used to implement features of the method 300.

Figure 4B:
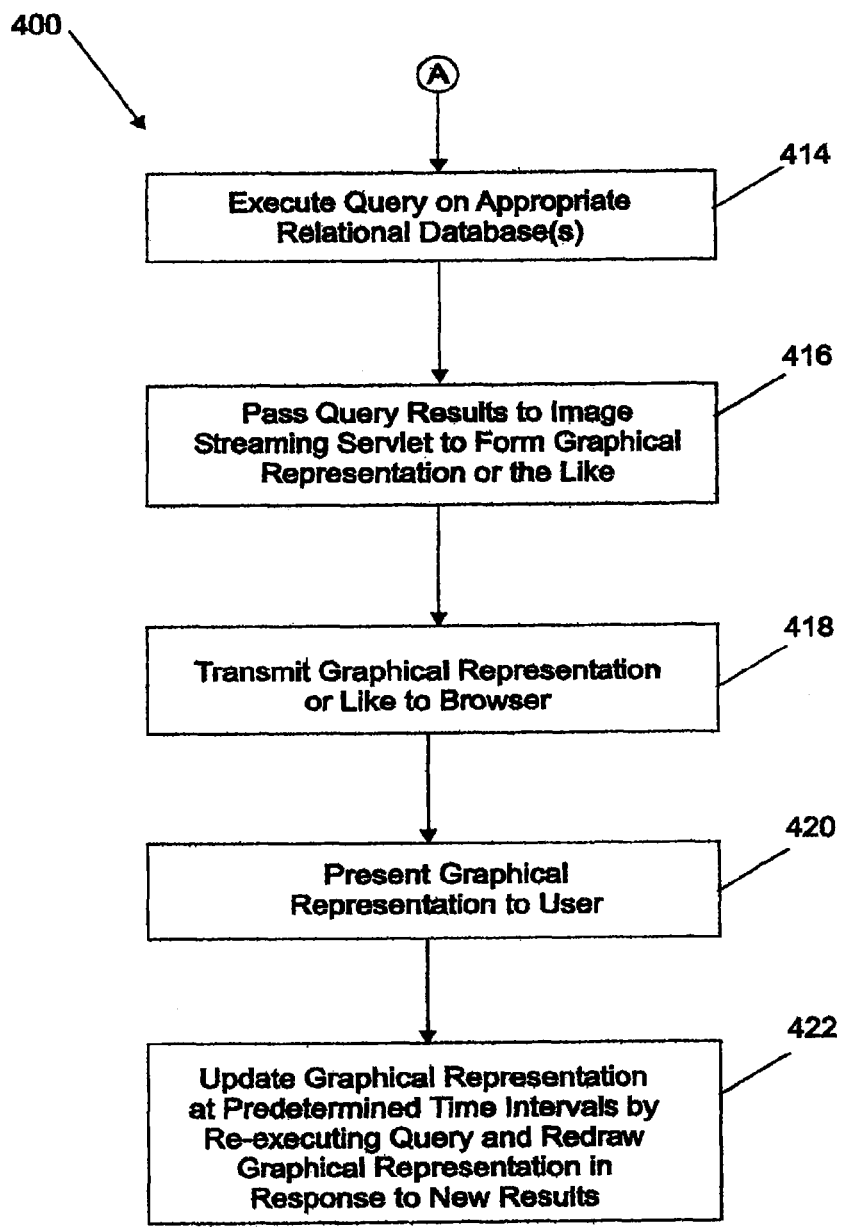
Figure 5:
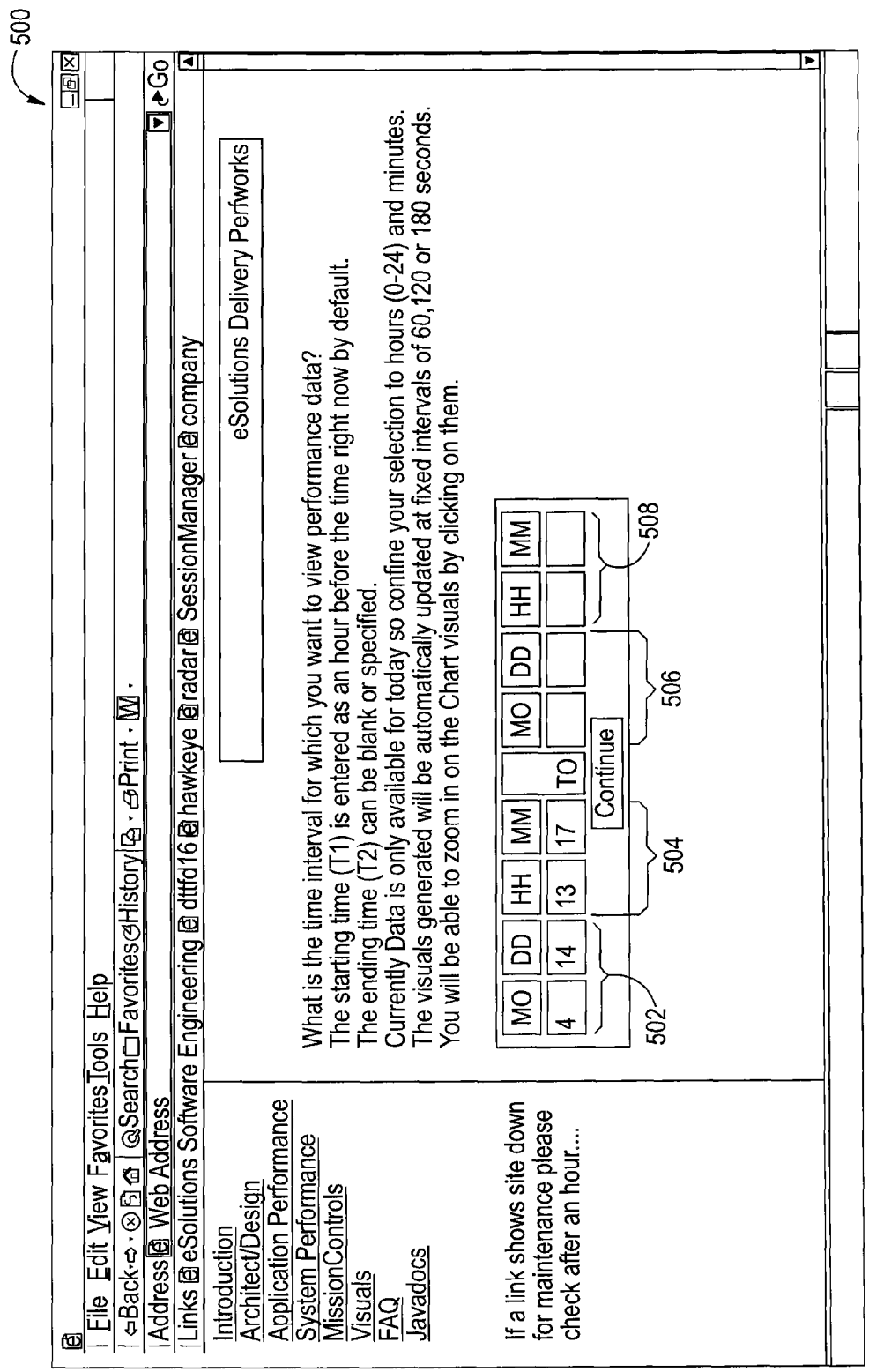
FIG. 5 is an exemplary graphical user interface (GUI), web page or screen shot of a parameter selection page to select a time interval that may be generated by a system to monitor performance of different domains in accordance with an embodiment of the present invention.
Figure 6:
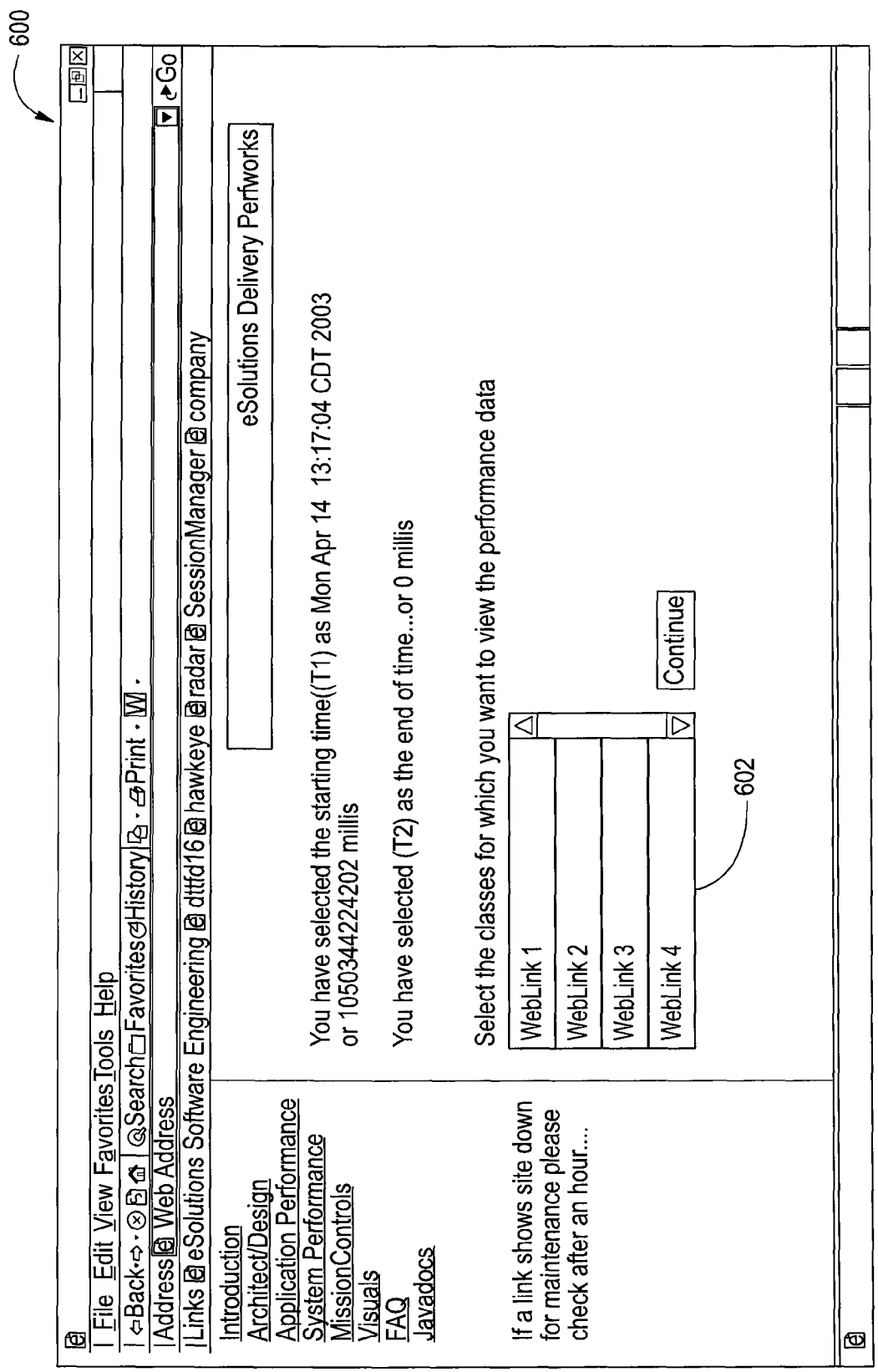
FIG. 6 is an exemplary GUI, web page or screen shot of a parameter selection page to select a host system that may be generated by a system to monitor performance of different domains in accordance with an embodiment of the present invention.
Figure 7:
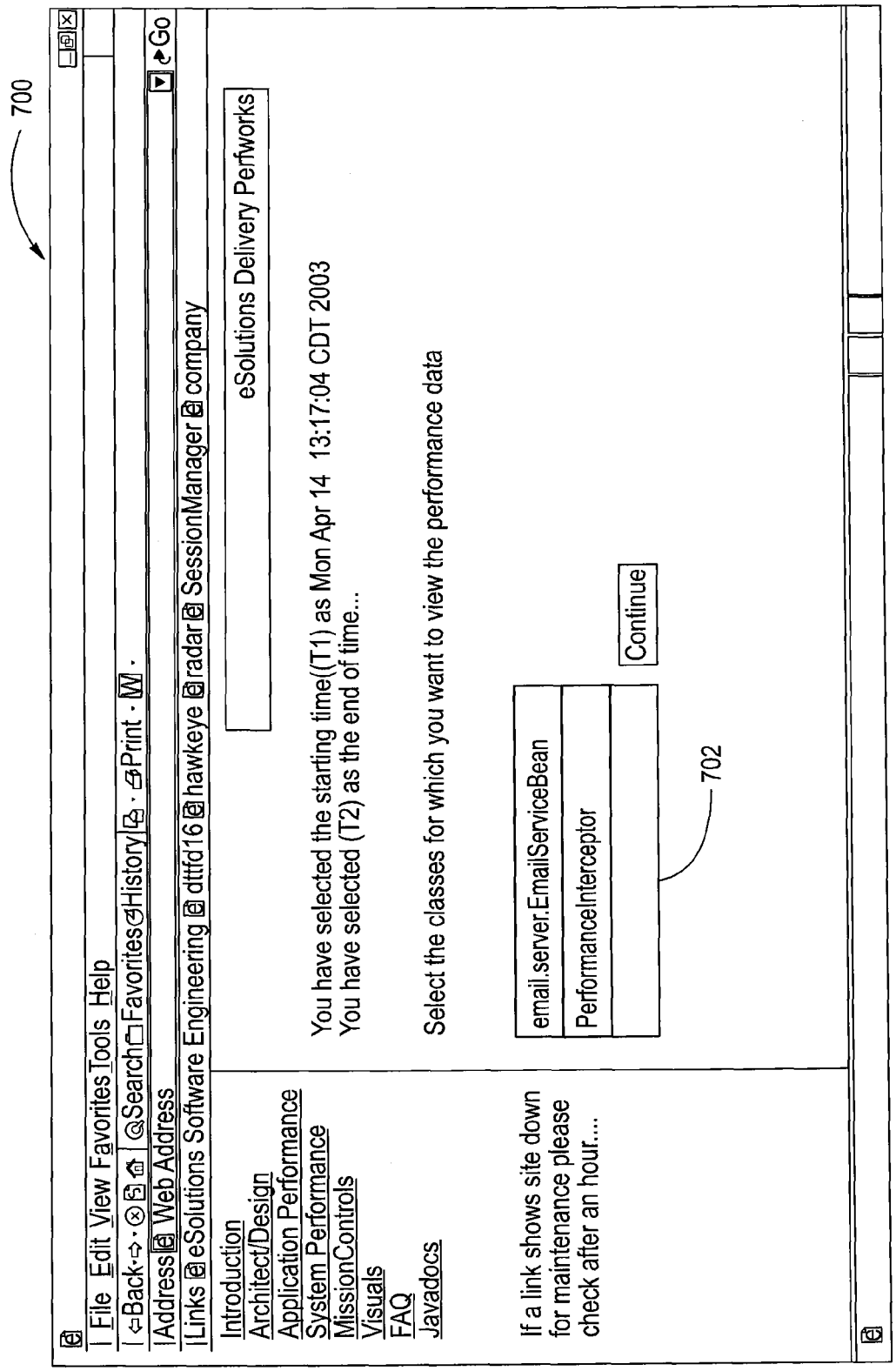
FIG. 7 is an exemplary GUI, web page or screen shot to select different classes or applications for retrieving and displaying performance data that may be generated by a system to monitor performance in accordance with an embodiment of the present invention.

FIGS. 4A and 4B are a flow chart of a method 400 to request and display performance data for different domains in accordance with an embodiment of the present invention. The method 400 may be embodied in a data structure in the system 200 or probes application 253 of FIG. 2. In block 402, the monitoring system or probes application 253 may be accessed by a user via a browser, such as the browser 234 of FIG. 2. In block 404, the probes application 253 may be started in response to the user accessing the system. In block 406, a parameter selection page or pages may be presented to the user on a display, such as display 240 in FIG. 2. The user may enter or select parameters that may be used to retrieve data collected by different probes, such as system probes 206 and application probes 222, associated with different domains. Referring also to FIGS. 5, 6 and 7, these Figures are each an exemplary graphical user interface (GUI), web page or screen shot of a parameter selection page 500 (FIG. 5), 600 (FIG. 6) and 700 (FIG. 7). The parameter selection pages 500, 600 and 700 may be generated by a data structure in the system 200 or probes application 253 in accordance with an embodiment of the present invention. In FIG. 5, the user may enter or select a time interval in the form over which the user desires to view or display performance data. The selection page 500 may include blocks for the user to enter a starting date and time, blocks 502 and 504 respectfully, and an ending date and time, blocks 506 and 508 respectfully. In FIG. 6, the parameter selection page 600 may be used to select a host system from a list 602 of host systems from which data has been gathered by system probes. In FIG. 7, the user may select from a list 702 of different classes or applications from which data has been gathered by application probes.

Referring back to FIG. 4, in block 408, parameters selected or entered by the user in each of the parameter selection pages may be transmitted to a server, such as server 244 in FIG. 2, by the browser. In block 410, the method 400 or probes application 253 (FIG. 2) may choose an appropriate raw query from a file, such as query file 260 in FIG. 2, based on the parameters entered or selected by the user. In block 412, the user selected parameters may be substituted into the raw query and the query may be converted to a structured query language (SQL) query or extensible mark-up language (XML) query by a data structure in the probes application 253. In block 414, the SQL or XML query may be executed by the probes application 253 on an appropriate database or databases, such as relational databases 214 in FIG. 2. In block 416, the query results may be passed to an image streaming servlet to form a graphical representation or other type representation of the query results or retrieved data. In block 418, the graphical representation or other representation may be transmitted by the server to the browser and in block 420, the graphical or other representation may be presented to the user, such as by displaying on display 240 (FIG. 2) or by other means. In block 422, the graphical representation may be updated or refreshed at predetermined time intervals by re-executing the query and redrawing the representation in response to new query results or data. The probes application 253 may include a data structure to update the graphical representation to provide live or real-time trend analysis. The appendix of this application includes an example of source code that may be used to implement the features of method 400 just described. At least portions of the method 400 may be implemented in the probes application 253.

The method 400 may be embodied in a computer readable medium or electronic readable medium, such as a memory 268 (FIG. 2) or the like, having computer-executable instructions for performing the method 400. The computer readable medium may include any type of medium, such as electronic, magnetic, optical, electromagnetic, infrared, semiconductor or the like.

Figure 8:
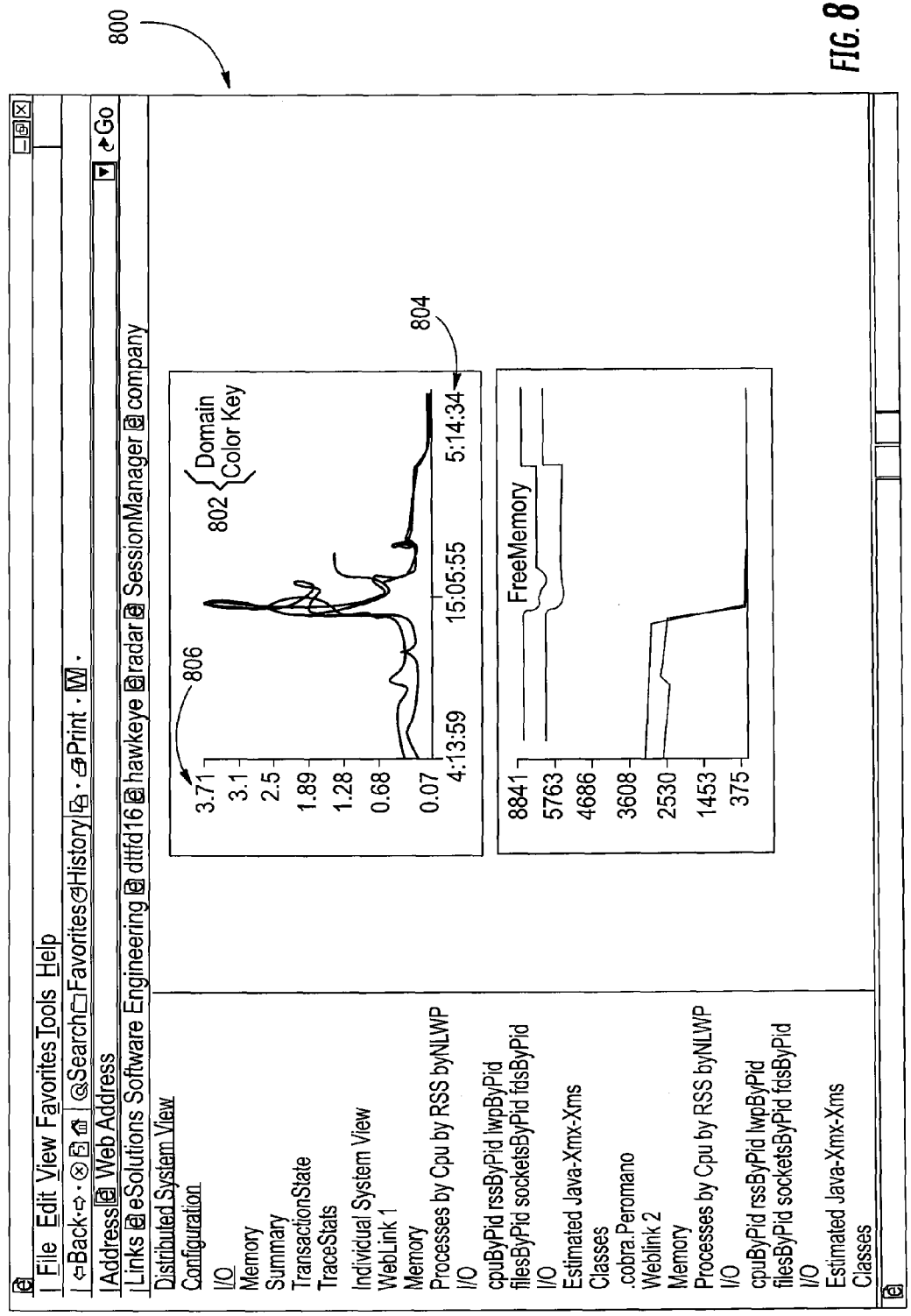
FIG. 8 is an exemplary GUI, web page or screen shot of performance data of different domains that may be generated by a system to monitor performance in accordance with an embodiment of the present invention.

FIG. 8 is an exemplary GUI, web page or screen shot of a presentation or graphical representation 800 of performance data of different domains that may be generated by a system, such as a data structure in system 200 in FIG. 2, in accordance with an embodiment of the present invention. As indicated, the performance data may be charted or represented over a time period that may be selected by the user as described above. Each of the domains may be represented by a different color with a color key 802 to indicate which colors represent which domains or by other means. The time interval may be represented on the horizontal or x-axis 804 and performance units or measurement units may be represented by an appropriate scale on the vertical or y-axis 806.

Figure 9:
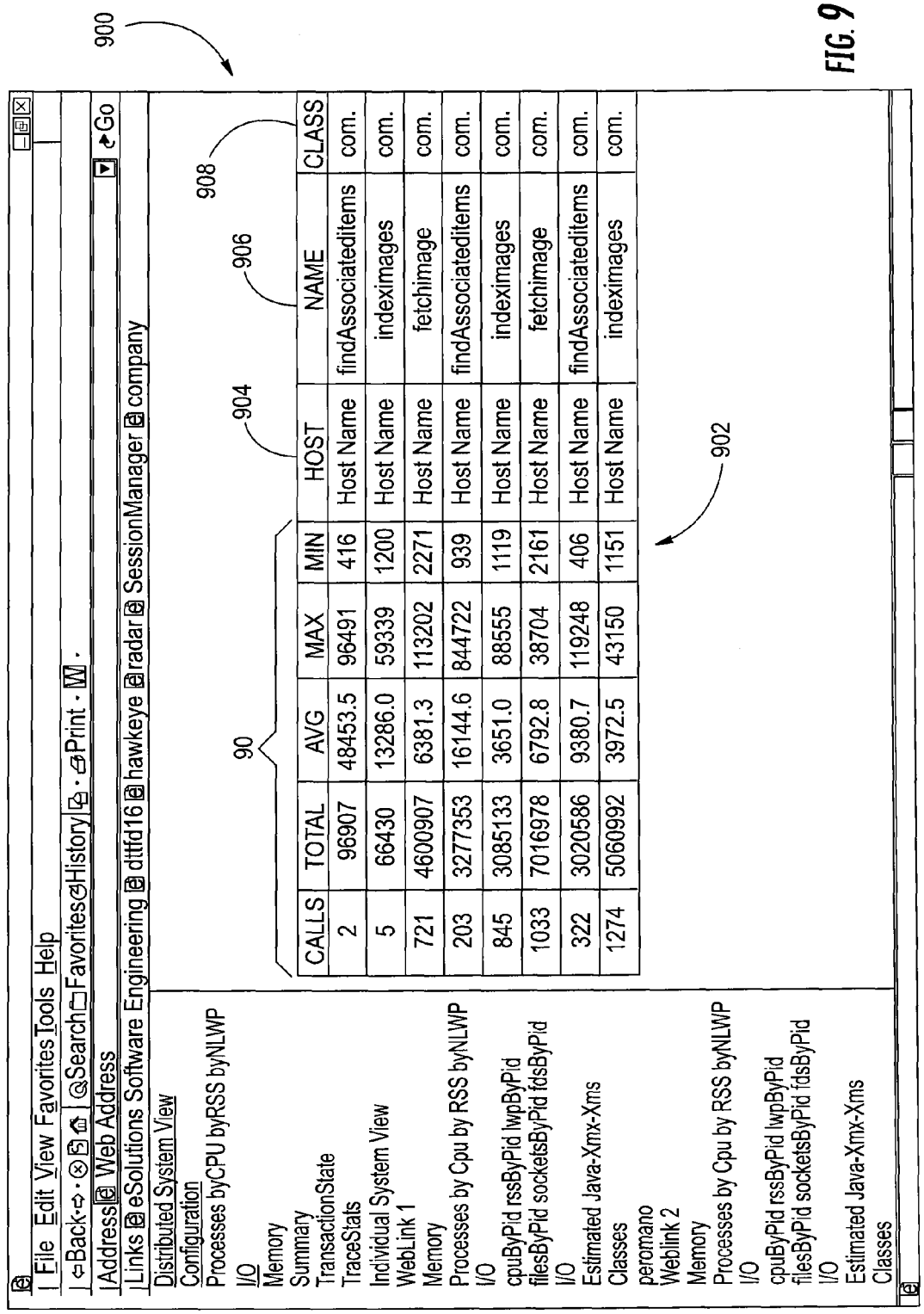
FIG. 9 is an exemplary GUI, web page or screen shot of application performance data that may be generated by a system in accordance with an embodiment of the present invention.

FIG. 9 is an exemplary GUI, web page or screen shot 900 of application performance data in the form of an application transactions table 902. The transactions table 902 may be generated by a system, such as a data structure in the system 200 of FIG. 2, in accordance with an embodiment of the present invention. The transactions table 902 may include a column 904 to identify the host system, a column 906 to identify a type of transaction and a column 908 to identify a class or application identification. The transactions table 902 may also include other columns 910 of different statistics associated with each transaction.

Figure 10:
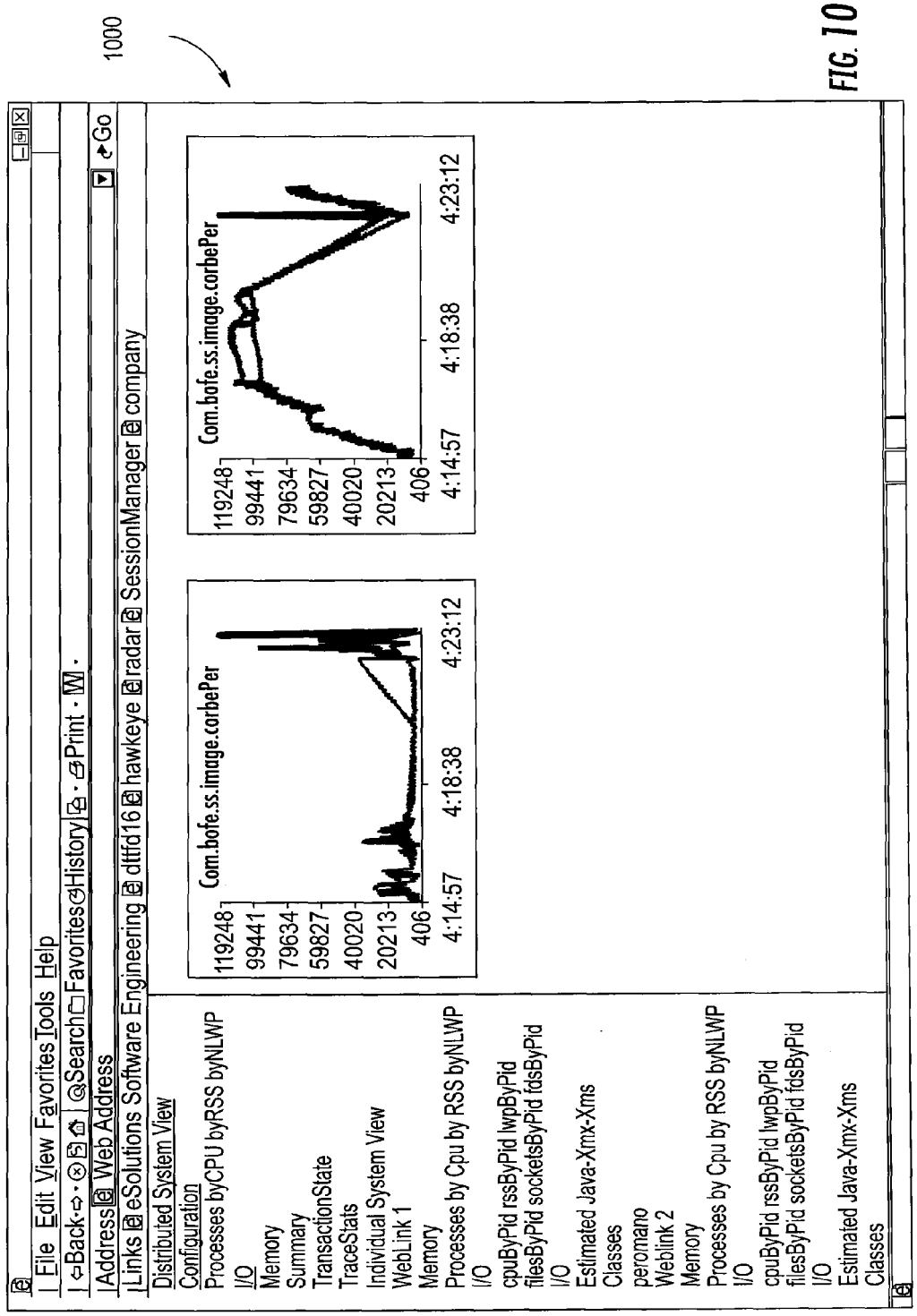
FIG. 10 is an exemplary GUI, web page or screen shot of application performance data that may be generated by a system in accordance with an embodiment of the present invention.

FIG. 10 is another exemplary GUI, web page or screen shot of a graphical representation 1000 of application performance data that may be generated by a system, such as a data structure in system 200 of FIG. 2, in accordance with an embodiment of the present invention. The graphical representation 1000 may illustrate response times and memory usage by a domain.

Figure 12:
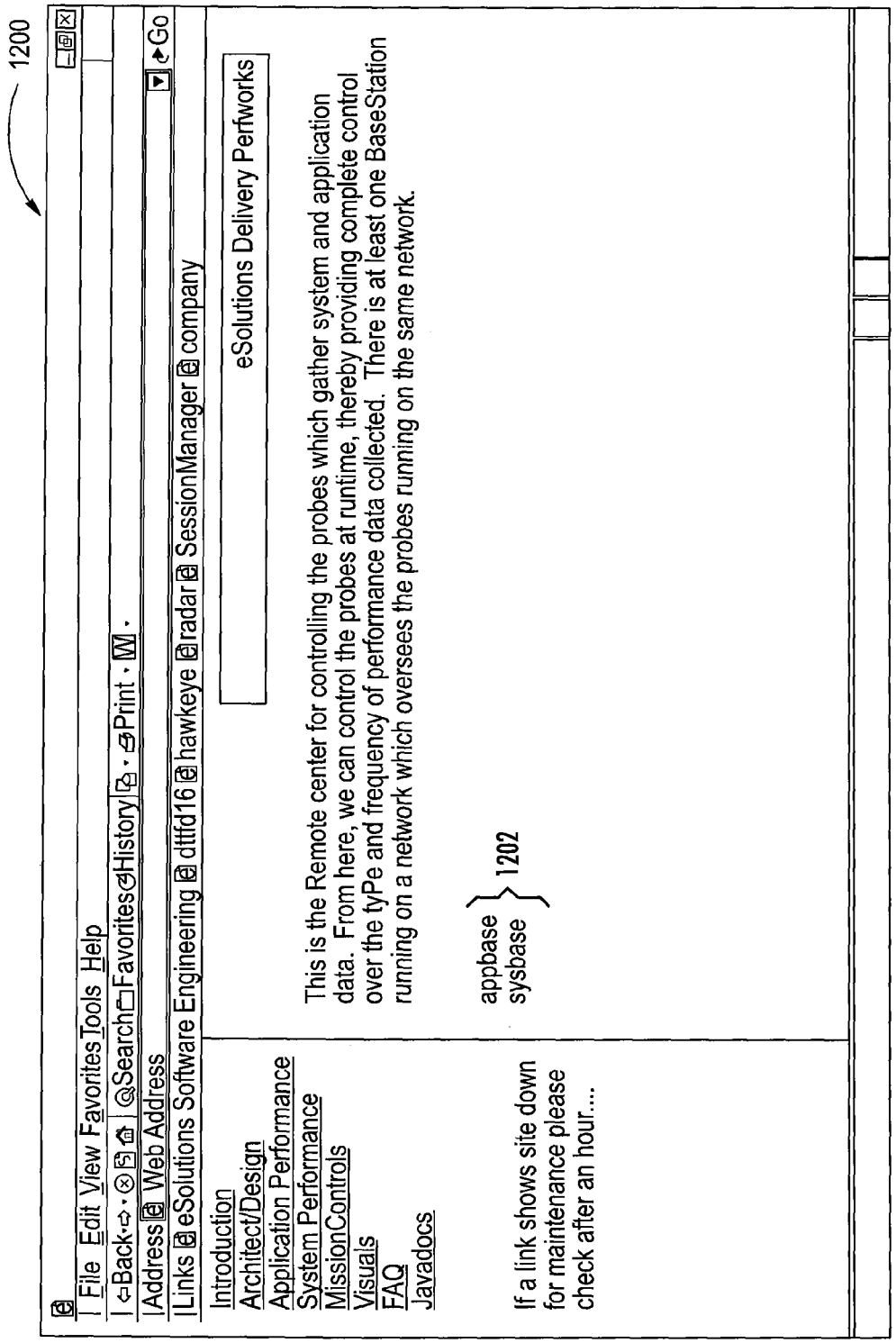
FIG. 12 is an exemplary GUI, web page or screen shot to select a base station to dynamically control operation of data gathering probes served by the base station in accordance with an embodiment of the present invention.

FIGS. 11A, 11B and 11C are a flow chart of a method 1100 to dynamically change the level or type of data or metrics and frequency of the data being collected by probes in accordance with an embodiment of the present invention. The method 1100 may be embodied in a data structure in the system 200 of FIG. 2, for example a data structure in the probes application 253. In block 1102, the system or probes application 253 may be accessed via a browser, such as the browser 234 of FIG. 2. In block 1104, a list of active base stations may be presented to the user for selection of an active base station by the user. The list of active base stations may be presented to the user by the probes application 253 and browser 234 in response to the user accessing a system control page. Referring also to FIG. 12, FIG. 12 is an exemplary GUI, web page or screen shot of a system control page 1200 in accordance with an embodiment of the present invention. The system control page 1200 may be generated by a data structure in the system 200, such as a data structure in the probes application 253 in FIG. 2. The system control page 1200 may be presented to the user to select a base station 1202 to dynamically control operation of data gathering probes served by the selected base station 1202.

In block 1106, a determination may be made if a base station was selected from the page 1200. If a base station is not selected after a predetermined time period, the method 1100 may stop at termination 1107. If a base station is selected, the method 1100 may advance to block 1108. In block 1108, the INS, such as INS 247 in FIG. 2, may be queried for a remote reference to the selected base station. The INS may be queried by the probes application 253 or server 244 (FIG. 2). In block 1110, the selected base station may be queried by the probes application 253 or server 244 for a list of probes served by the base station. In block 1112, the base station 210 may transmit a list of each active probe and associated control module to the server 244 or probes application 253. In block 1114, a list of each active probe by probe identification and associated controllable parameters may be presented for the user to alter or select new parameters of any active probe. The list of each active probe may be presented by the server 244 and browser 234 or the probes application 253 and browser 234.

Figure 13:
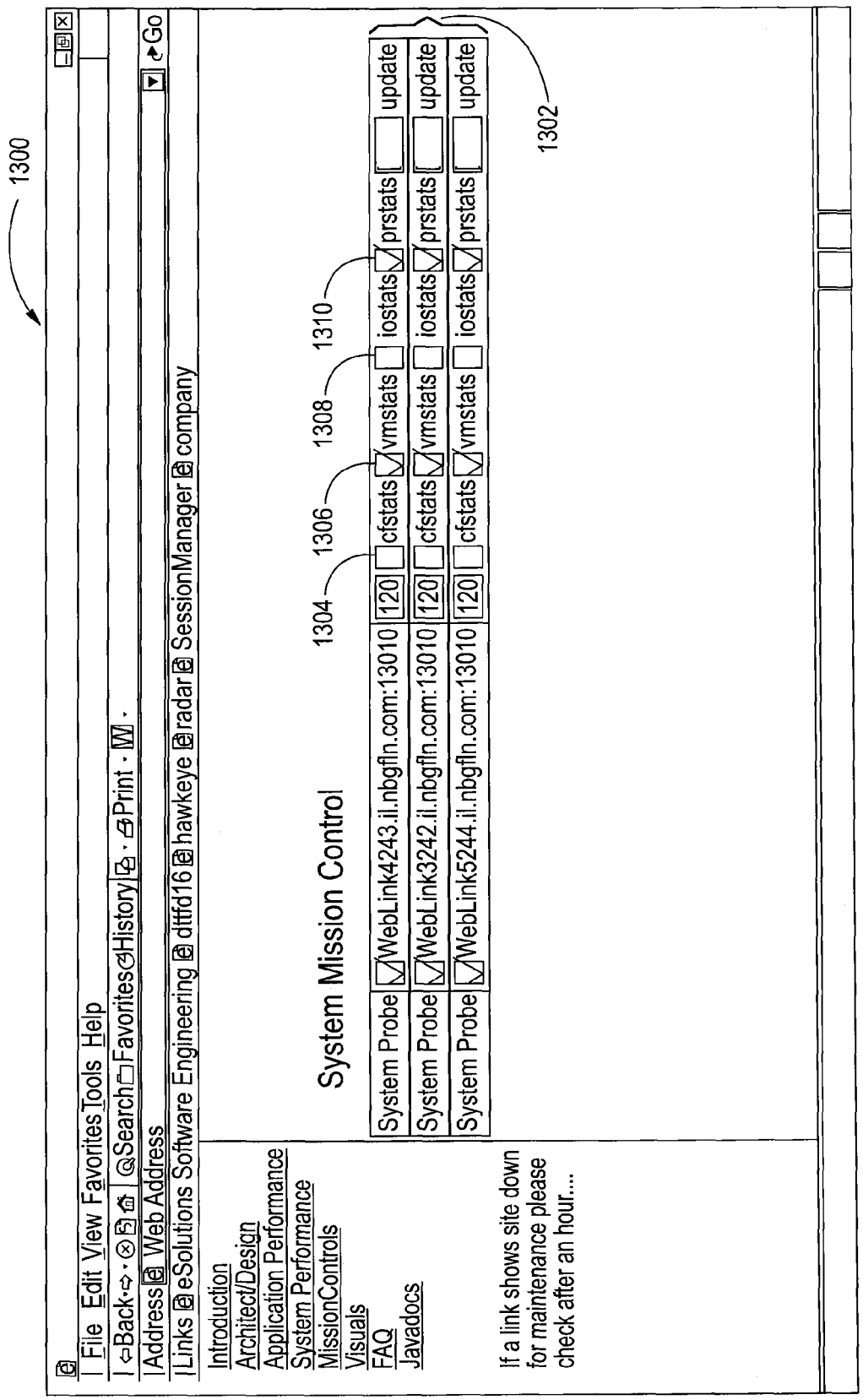
FIG. 13 is an exemplary GUI, web page or screen shot to select parameters to control operation of system probes in accordance with an embodiment of the present invention.
Figure 14:
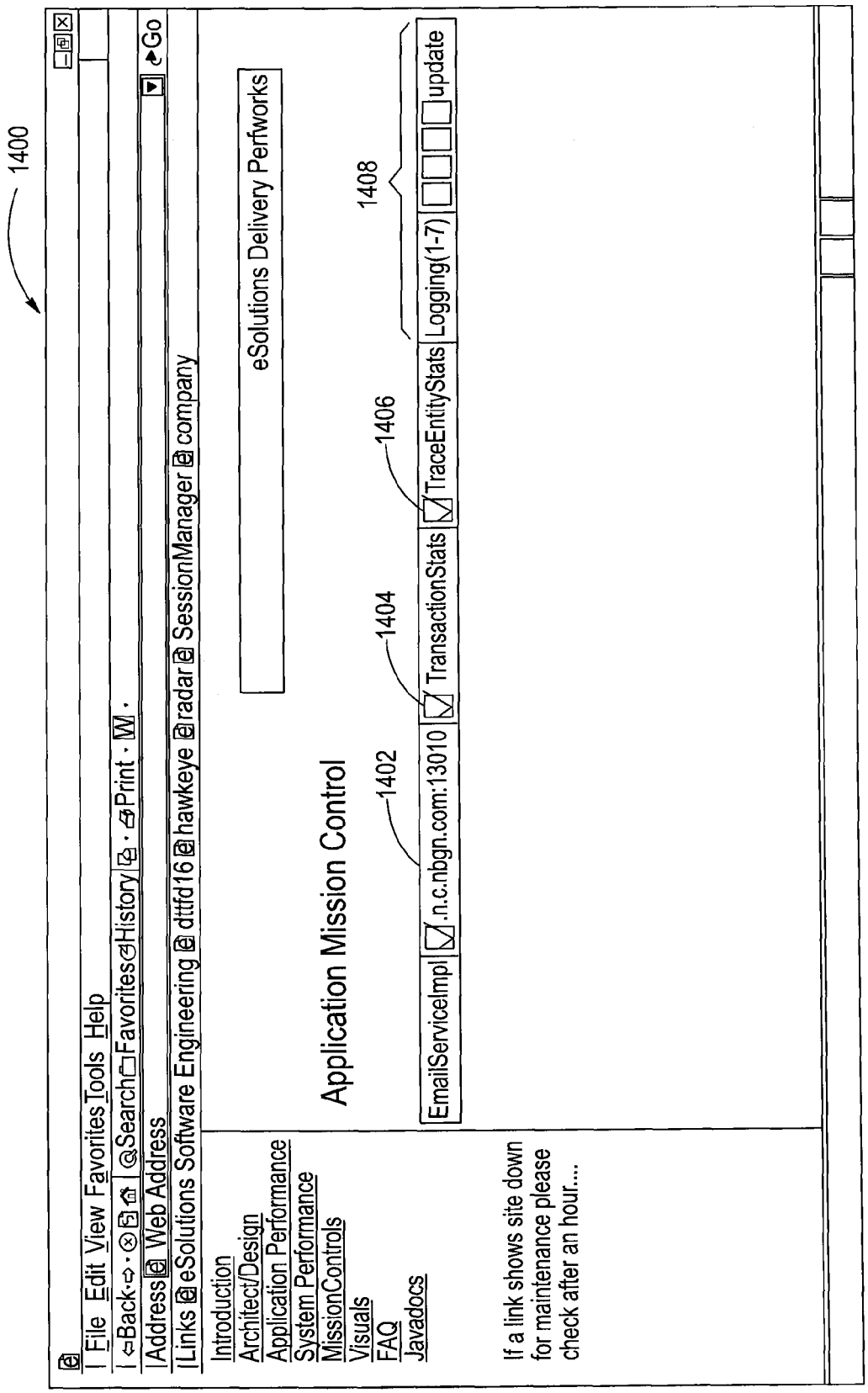
FIG. 14 is an exemplary GUI, web page or screen shot to select parameters to control operation of an application probe in accordance with an embodiment of the present invention.

Referring also to FIGS. 13 and 14, FIG. 13 is an exemplary GUI, web page or screen shot 1300 to select parameters to control operation of system probes, such as system probe 216 (FIG. 2) in accordance with an embodiment of the present invention. The web page 1300 may be generated by a data structure in system 200, such as a data structure in probes application 253 of FIG. 2. The web page 1300 may include a list 1302 of each system probe 206 and associated parameters that may be selected by the user to control the level or type data collected and the frequency at which the data may be collected by each system probe 206. In the exemplary web page 1300, a block 1304 designated "cfstats" may be provided for a user to check to cause the system probe 206 to collect configuration statistics or data, as previously described. A block 1306 designated "vmstats" may also be provided in the exemplary web page 1300 for a user to select to cause the system probe 206 to collect virtual memory statistics or data, as previously described. A block 1308 designated "iostats" may be provided for a user to select to cause the system probe 206 to collect I/O statistic and a block 1310 designated "prstats" may be provided for the user to select for the system probe 206 to collect process statistics or data.

FIG. 14 is an exemplary GUI, web page or screen shot 1400 to select parameters to control operation of an application probe, such as application probe 222 or 226 (FIG. 2) in accordance with an embodiment of the present invention. The web page 1400 may be generated by a data structure in system 200, such as probes application 253 in FIG. 2. The web page 1400 may include a list 1402 of each application probe 222 and associated parameters that may be selected by the user to control the level or type data collected and the frequency at which data may be collected by each application probe 222. A block 1404 designated "Transaction Stats" may be provided in web page 1400 for a user to check for the application probe 222 or 226 to collect transaction type data or statistics as previously described. A block 1406 designated "Trace Entity Stats" may also be provided for a user to check for the application probe 222 or 226 to collect trace data as previously described. Blocks 1408 designated "Logging (1-7)" may also be provided in the web page 1400 for a user to select the level of logging of the statistics to be collected by the application probe 222 or 226.

Returning to FIG. 11B, in block 1116 a determination may be made if any new parameter was selected or altered in block 1114 (FIG. 11A). If no parameter was altered, the method 1100 may stop at termination 1118. If a parameter was altered in block 1114, the method 1100 may advance to block 1120. In block 1120, the altered parameters and associated probe identification may be sent to the server 244 or probe application 252 by the browser 234. In block 1122, the browser 234 may enter a wait state for a predetermined time period for activation of the altered parameters. In block 1124, the probes application 253 may match the probe identification with probe identifications in the probe table 218 for each probe with altered parameters. If there is no probe identification match in block 1126, the method 1100 may stop at termination 1128. If a probe identification is matched in block 1126, the method 1100 may advance to block 1130. In block 1130, the probe application 253 or server 244 may transmit a new control module to the probe. In block 1132, the probe may stop activity in response to receiving the new control module. In block 1134, the probe may switch state according to the new control module. The probe may return a signal corresponding to the updated module as a confirmation to the server 244 or probes application 253 that the probe's operational parameters were successfully changed. In block 1136, the probes application 253 or server 244 may update the probes table 218 in the base station 210 in response to receiving the confirmation. In block 1138, the browser wait state may time out and the method 1100 may return to block 1104 in FIG. 11A and the method 1100 may proceed as previously described.

The method 1100 may be embodied in a computer readable medium or electronic readable medium, such as a memory 268 (FIG. 2) or the like, having computer-executable instructions for performing the method 1100. The computer readable medium may include any type of memory, such as flash memory, floppy disk, compact disc-read only memory (CD-ROM), non-volatile ROM, random access memory (RAM) or the like. The appendix to this application includes examples of source code that may be used to implement the features of method 1100.

Elements of the present invention may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in the medium for use by or in connection with a system, such as system 200 of FIG. 2. Examples of such a medium may be illustrated graphically in FIG. 2 as input devices 242, communication channels 245, memory 268 or similar devices. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network such as the Internet. The computer-usable or readable medium could also be paper or another suitable medium upon which the program may be printed. The appendix to this application includes examples of source code that may be used to implement some of the features described in this specification.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to monitor performance of a plurality of different domains associated with a computer system, comprising:

in response to activating one or more base stations, registering the one or more base stations with an interoperable naming service and assigning a unique identifier associated with each base station;

activating a system probe embedded into an operating system executing on a host within one of the plurality of different domains, wherein the system probe includes an associated control data structure that includes user-selectable parameters operable to control operation of the system probe and wherein the system probe may dynamically receive changes to the user-selectable parameters and implement the changes without affecting operation of the host and the operating system;

associating, via a negotiator software process, a base station from amongst the one or more base stations with the system probe;

collecting, from the system probe, at least one of operating system data, network data and performance data related to operation of a host processor on which the operating system is operable;

communicating the collected data from the system probe to the associated base station, wherein transferring occurs on a low priority thread scheduled when higher priority threads of the operating system are inactive;

correlating, via a computing device processor, data collected from each of the plurality of different domains over a common time period; and displaying, via a computing device user interface, the data collected for selected ones of the different domains together in relation to the common time period.

2. The method of claim 1, further comprising instrumenting each of the plurality of different domains to be monitored.

3. The method of claim 2, wherein instrumenting further comprises inserting performance gathering code into one of source code or byte code of each of the plurality of different domains to be monitored.

4. The method of claim 1, further comprising activating at least one application probe embedded in a plurality of applications to gather data related to performance of at least one application.

5. The method of claim 4, further comprising searching for a negotiator by the activated system probe and each activated application probe.

6. The method of claim 5, further comprising:
inactivating or self-destructing any probe in response to the probe not receiving a response from a negotiator; and
releasing any resources associated with an inactivated or self-destructed probe.

7. The method of claim 5, further comprising allocating a queue to store data received from each application probe.

8. The method of claim 5, further comprising performing a handshaking operation between one or more available base stations and each activated probe in response to the activated probe being associated with one of the one or more available base stations.

9. The method of claim 5, further comprising storing, in computing device memory, a probe identifier and a control data structure for each activated probe served by any available base station.

10. The method of claim 9, further comprising:
communicating a status request signal from the base station to each of one or more probes served by the base station at predetermined time intervals; and
communicating a message from each of the one or more probes corresponding to a control data structure of a probe in response to receiving the status request signal.

11. The method of claim 4, further comprising operating each of the probes in a parallel mode on separate threads to gather performance data until operation is terminated.

12. The method of claim 4, further comprising balancing a quantity of system and application probes served between each of a plurality of base stations.

13. The method of claim 4, further comprising presenting a control page to a user to dynamically control operation of each probe without affecting operation of an associated domain.

14. The method of claim 4, further comprising dynamically controlling a type of performance data collected and frequency of collecting the performance data by each probe without affecting operation of an associated domain.

15. The method of claim 1, further comprising activating the interoperable naming service on a server, prior to registering the one or more base stations, in response to accessing a data structure on the server to monitor performance of the plurality of different domains in the system.

16. The method of claim 15, further comprising using a browser to access the data structure.

17. The method of claim 15, further comprising activating the one or more base stations in response to accessing the data structure.

18. The method of claim 17, further comprising in response to registering the one or more base stations with the interoperable naming service, connecting each base station to at least one database.

19. The method of claim 1, wherein collecting further comprises collecting, from the system probe the data in a single process address by taking a snapshot of a kernel image at a selected time interval.

20. The method of claim 1, wherein communicating further comprises communicating the collected data from the system probe to the associated base station using Transmission Control Protocol.

21. The method of claim 1, further comprising communicating signals from the base station to each of one or more associated system probes using User Datagram Protocol.

22. The method of claim 1, further comprising accessing a probes application on a server to start the probes application to retrieve the data collected from the system probe.

23. The method of claim 22, further comprising presenting, via a computing device user interface, at least one parameter selection page for a user to select parameters to control operation of the system probe, wherein the parameters are related to performance of the host processor.

24. The method of claim 23, wherein presenting further comprises presenting a form for the user to enter or select a time interval over which performance data is desired.

25. The method of claim 23, wherein presenting further comprises presenting a form for the user to enter or select at least one host or domain for which performance data is desired.

26. The method of claim 23, wherein presenting further comprises presenting a form for the user to enter or select at least one class of performance data desired.

27. The method of claim 23, further comprising choosing an appropriate raw query in response to receiving the user's selection of parameters.

28. The method of claim 27, further comprising substituting the user's selected parameters into the raw query.

29. The method of claim 28, further comprising converting the raw query to a structured query language (SQL) query.

30. The method of claim 28, further comprising executing the query on at least one appropriate database to retrieve performance data corresponding to the query.

31. The method of claim 30, further comprising presenting, via a computing device user interface, the results of the query.

32. The method of claim 31, wherein presenting the results further comprises presenting performance data for more than one of the plurality of different domains together for a selected or entered time interval.

33. The method of claim 31, wherein presenting the results further comprises presenting, via a computing device user interface, a graphical representation of the results.

34. The method of claim 33, further comprising updating the graphical representation at predetermined time intervals.

35. The method of claim 34, wherein updating the graphical representation further comprises re-executing the query and re-drawing the graphical representation in response to receipt of new results.

* * * * *